United States Patent [19]

Kubota et al.

[11] 4,404,301
[45] Sep. 13, 1983

[54] POLYMERIC LIGHT STABILIZERS HAVING AT LEAST ONE 2,2,6,6-TETRAALKYL PIPERIDYL GROUP AND SYNTHETIC RESIN COMPOSITIONS CONTAINING THE SAME

[75] Inventors: Naohiro Kubota, Ageo; Toshihiro Shibata, Omiya; Ryozo Arata, Urawa, all of Japan

[73] Assignee: Adeka Argus Chemical Co., Ltd., Urawa, Japan

[21] Appl. No.: 370,900

[22] Filed: Apr. 22, 1982

[30] Foreign Application Priority Data

Apr. 23, 1981 [JP]  Japan ................................. 56-61764

[51] Int. Cl.[3] ........................ C08K 5/34; C08L 67/00; C07D 211/08
[52] U.S. Cl. .................................... 524/99; 524/102; 525/327.6; 525/203; 525/375; 546/242; 546/190
[58] Field of Search ..................... 524/86, 87, 99, 110, 524/111, 114; 525/327.6, 203, 375; 546/242, 190

[56]         References Cited
       U.S. PATENT DOCUMENTS 4,233,410  11/1980  Rody et al. ......................... 525/424
4,279,805  7/1981  Ohzeki et al. ...................... 524/225

*Primary Examiner*—John Kight, III
*Assistant Examiner*—Kriellion Morgan

[57]              ABSTRACT

Polymeric light stabilizers are provided having at least one 2,2,6,6-tetraalkyl piperidyl group in the molecule and a molecular weight within the range from about 1000 to about 20,000, that are polymers of an unsaturated carboxylic acid ester selected from the group consisting of unsaturated cycloaliphatic mono-, di, and tri-carboxylic acid esters having from seven to about thirty carbon atoms; unsaturated branched-chain aliphatic di- and tri-carboxylic acid esters having from four to about thirty carbon atoms; sorbic acid ester, 3,8-nonadienyl acid ester, oleic acid ester, linolenic acid ester and ricinoleic acid ester; or copolymers of at least one thereof with another copolymerizable unsaturated monomer; and synthetic resin compositions having improved light stability comprising per 100 parts by weight of resin from 0.001 to 10 parts by weight of the polymeric light stabilizer.

26 Claims, No Drawings

POLYMERIC LIGHT STABILIZERS HAVING AT LEAST ONE 2,2,6,6-TETRAALKYL PIPERIDYL GROUP AND SYNTHETIC RESIN COMPOSITIONS CONTAINING THE SAME

Many synthetic polymers such as polyethylene, polypropylene, ABS resin, polyvinyl chloride, and polyurethanes undergo degradation with a resulting deterioration in physical properties, such as discoloration and a loss of mechanical strength, upon exposure to light.

Consequently, a variety of light stabilizers have been proposed to inhibit such deterioration. However, the available light stabilizers are unsatisfactory, some being destroyed by heat and oxidation, others being extracted by water or organic solvents, and some imparting color to the polymers.

2,2,6,6-Tetraalkyl piperidine compounds do not impart color to the polymer, and act as quenchers. However, the available piperidine compounds are unsatisfactory in stabilizing effectiveness, are so volatile that they are lost when the polymer is heated at elevated temperatures, and are extracted by water.

2,2,6,6-Tetraalkyl piperidine compounds of high molecular weight are said to have improved properties in these respects. Several types of polymers have been described. Polyesters containing hindered piperidyl groups in the molecule are proposed in Japanese patent publication Kokai No. 141,883/77. Acrylate polymers containing hindered piperidyl groups are proposed in Japanese patent publication Kokai No. 157,612/80. While the volatility of these compounds is low, their stabilizing effectiveness is unsatisfactory.

In accordance with the present invention, polymeric light stabilizers are provided having at least one 2,2,6,6-tetraalkyl piperidyl group in the molecule and a molecular weight within the range from about 1000 to about 20,000, that are polymers of an unsaturated carboxylic acid ester selected from the group consisting of unsaturated cycloaliphatic mono-, di-, and tri-carboxylic acid esters having from seven to about thirty carbon atoms; unsaturated branched-chain aliphatic di- and tri-carboxylic acid esters having from four to about thirty carbon atoms; sorbic acid ester, 3,8-nonadienyl acid ester, oleic acid ester, linolenic acid ester and ricinoleic acid ester; or copolymers of at least one thereof with another copolymerizable unsaturated monomer; and synthetic resin compositions having improved light stability comprising per 100 parts by weight of resin from 0.001 to 5 parts by weight of the polymeric light stabilizer.

A first class of polymeric light stabilizers of the invention are prepared from such unsaturated carboxylic acid esters that are esters of unsaturated carboxylic acids with a 2,2,6,6-tetraalkyl piperidyl alcohol. These can be easily prepared by conventional methods.

Polymers or copolymers of branched chain di and tri carboxylic acid esters such as itaconic acid ester are preferred polymers of the invention, and are polymers composed of units of the formula:

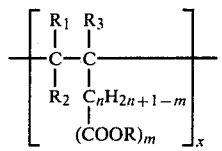

wherein:
R$_1$ and R$_2$ are H or alkyl;
R$_3$ is H, alkyl or —COOR;
x is the number of units in the polymer;
n is a number from 1 to 10;
m is a number from 1 to 3; and
when m is 1, R$_3$ is —COOR, and when m is 3, R$_3$ is H or alkyl and R is alkyl or a group containing 2,2,6,6-tetraalkyl piperidyl group.

In the case of itaconic acid ester, the formula takes the form:

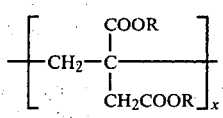

Unsaturated cyclic mono, di or tri carboxylic acid esters are also preferred and are polymers composed of units having the formula:

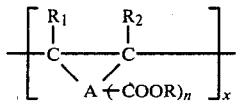

wherein:
R$_1$ and R$_2$ are H, alkyl or COOR;
A is alkylene having from about three to about ten carbon atoms or cyclopentylene;
x is the number of units in the polymer; and
n is a number from 1 to 3.

Other unsaturated monomers which can be copolymerized with such unsaturated carboxylic acid esters include ethylene, propylene, butene-1, isobutene, hexene, octene, decene, dodecene, tetradecene, hexadecene, octadecene, eicosene, styrene, α-methylstyrene, cyclohexene, butadiene, vinyl chloride, acrylonitrile, methyl vinyl ketone, methyl vinyl ether, vinyl acetate, acrylic acid, methacrylic acid, maleic anhydride, methyl acrylate, butyl acrylate, methyl methacrylate, dimethyl maleate, diethyl maleate, and dibutyl maleate.

A second class of polymeric light stabilizers of the invention are prepared by polymerization from such unsaturated carboxylic acid esters with another copolymerizable monomer containing a 2,2,6,6-tetraalkyl piperidyl group, such as 2,2,6,6-tetramethyl-4-piperidyl vinyl ether, 1,2,2,6,6-pentamethyl-4-piperidyl vinyl ether, 2,2,6,6-tetramethyl-4-piperidyl allyl ether, 1,2,2,6,6-pentamethyl-4-piperidyl allyl ether, and esters of acrylic acid, methacrylic acid, maleic acid or fumaric acid with a 2,2,6,6-tetraalkyl piperidyl alcohol.

It will accordingly be evident that the polymers or copolymers of the unsaturated carboxylic acid ester employed as a light stabilizer in this invention contain at least one 2,2,6,6-tetraalkyl piperidyl group in the molecule. If the unsaturated carboxylic acid ester contains a 2,2,6,6-tetraalkyl piperidyl group, the light stabilizer can be a homopolymer of copolymer thereof, and if the unsaturated carboxylic acid ester contains no 2,2,6,6-tetraalkyl piperidyl group, the light stabilizer should be a copolymer of said unsaturated carboxylic acid ester with another unsaturated monomer containing a 2,2,6,6-tetraalkyl piperidyl group.

The unsaturated carboxylic acid esters of both classes can be derived, for example, from any of the following unsaturated cycloaliphatic carboxylic acids: cyclohexene carboxylic acid; methyl cyclohexene carboxylic acid; 3,3,5,5-tetramethyl-4-aza-1-cyclohexene carboxylic acid; tetrahydrophthalic acid; methyl tetrahydrophthalic acid; cyclohexene-1,2,3-tricarboxylic acid; methyl cyclohexene-1,2,3-tricarboxylic acid; endomethylene tetrahydrophthalic acid; methyl endomethylene tetrahydrophthalic acid; methyl isopropyl bicyclo-(2,2,2)-5-hexene-2,3-di-carboxylic acid; abietic acid; neoabietic acid; and levopimaric acid.

Unsaturated branched-chain aliphatic carboxylic acids include itaconic acid; 2-methylene glutaric acid; alkenyl succinic acids such as diisobutenyl succinic acid, dodecenyl succinic acid and octadecenyl succinic acid; 3-butene-1,2,3-tricarboxylic acid; and 1-hexene-2,4,6-tricarboxylic acid.

The unsaturated carboxylic acid esters of the first class are esters of any of the above unsaturated acids with a 2,2,6,6-tetraalkyl piperidyl alcohol represented by one of the formulae (I) and (II):

$$\begin{array}{c} CH_3CH_2-R_1 \\ HO-X \diagup\!\!\!\diagdown N-R_2 \\ R_1 \quad CH_3CH_2-R_1 \end{array} \quad (I)$$

$$\begin{array}{c} R_1-CH_2-CH_3 \\ HO-R_3-N \diagup\!\!\!\diagdown Y \\ R_1-CH_2CH_3 \; R_1 \end{array} \quad (II)$$

wherein:

X is selected from the group consisting of

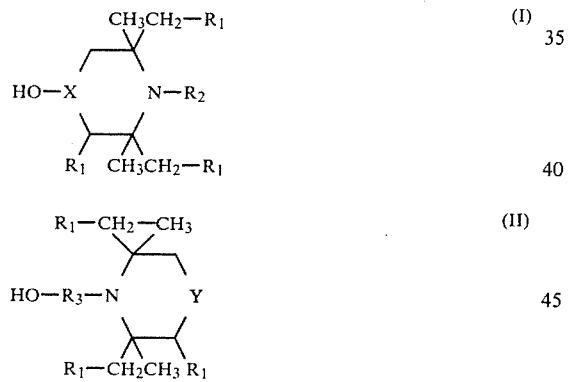

($R_4$ is lower alkyl);

$R_1$ is hydrogen or methyl;

$R_2$ is hydrogen; O·; alkyl having from one to eighteen carbon atoms; aralkyl having from seven to ten carbon atoms; hydroxyalkyl; epoxy alkyl; carboxyalkyl; phenoxyalkyl and haloalkyl having from two to fifteen carbon atoms;

Y is selected from the group consisting of >CH$_2$; >C=O; and $$\diagdown C \diagup\!\!\!\diagdown\!\!\!\! \begin{array}{c} O \\ R_5; \\ O \end{array}$$

($R_5$ is alkylene having from two to eighteen carbon atoms);

$R_3$ is alkylene, hydroxyalkylene or phenoxyalkylene having from two to fifteen carbon atoms.

Exemplary $R_2$ alkyl are methyl, ethyl, butyl, octyl, dodecyl and octadecyl; exemplary $R_2$ aralkyl is benzyl; phenethyl; exemplary other $R_2$ are 2-hydroxyethyl, 2-hydroxypropyl, 2-hydroxybutyl, 2,3-dihydroxypropyl, 2,3-epoxypropyl, 2-hydroxy-3-phenoxypropyl, 2-acetoxyethyl and 2-chloroethyl.

Exemplary $R_3$ alkylene are ethylene, 1,2-propylene, 1,2-butylene, 2-hydroxy-1,3-propylene and 3-phenoxy-1,2-propylene.

Exemplary $R_4$ lower alkyl are methyl, ethyl, propyl and butyl.

Exemplary $R_5$ alkylene are ethylene, 1,2-propylene, 1,2-butylene, 1,2-octylene, 1,2-dodecylene, 1,2-octadecylene, 1,3-propylene, and 2,2-dimethyl-1,3-propylene.

2,2,6,6-Tetrallkyl piperidyl alcohols represented by formulae (I) and (II) are as follows:

1.

$$\begin{array}{c} CH_3CH_3 \\ HO-\diagup\!\!\!\diagdown NH \\ CH_3CH_3 \end{array}$$

2.

$$\begin{array}{c} CH_3C_2H_5 \\ HO-\diagup\!\!\!\diagdown NH \\ CH_3\;CH_3C_2H_5 \end{array}$$

3.

$$\begin{array}{c} CH_3CH_3 \\ HO-\diagup\!\!\!\diagdown N-CH_3 \\ CH_3CH_3 \end{array}$$

4.

$$\begin{array}{c} CH_3CH_3 \\ HO-\diagup\!\!\!\diagdown N-C_2H_4OH \\ CH_3CH_3 \end{array}$$

5.

$$\begin{array}{c} CH_3CH_3 \\ HO-\diagup\!\!\!\diagdown N-CH_2-CH\!\!\!\!\diagup\!\!\!\!\!{}^O\!\!\!\diagdown\!\!\! CH_2 \\ CH_3CH_3 \end{array}$$

6.

$$\begin{array}{c} CH_3CH_3 \\ HOCH_2\!\!\!\diagup\!\!\!\!{}^O\!\!\!\diagdown NH \\ CH_3\diagdown\!\!\!\!{}_O\!\!\!\diagup CH_3CH_3 \end{array}$$

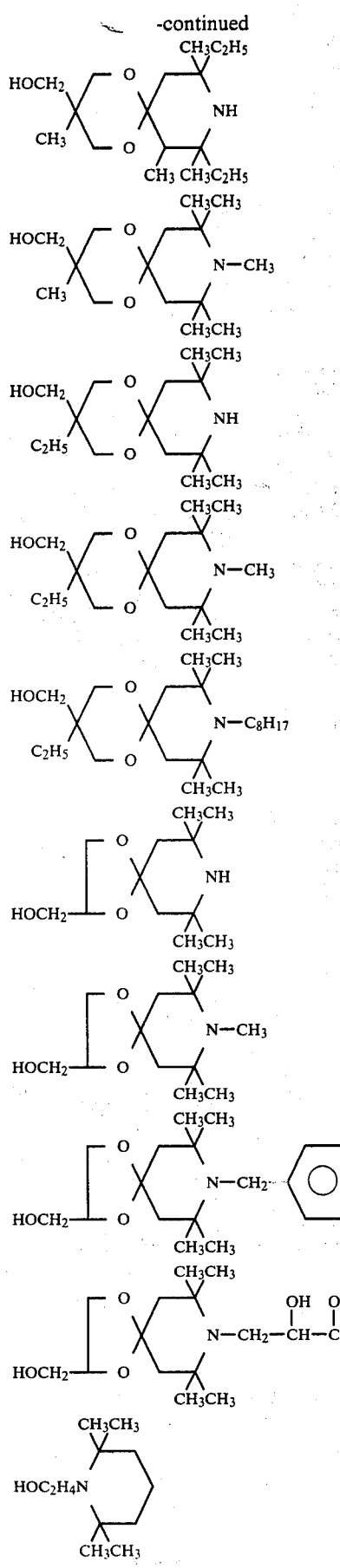
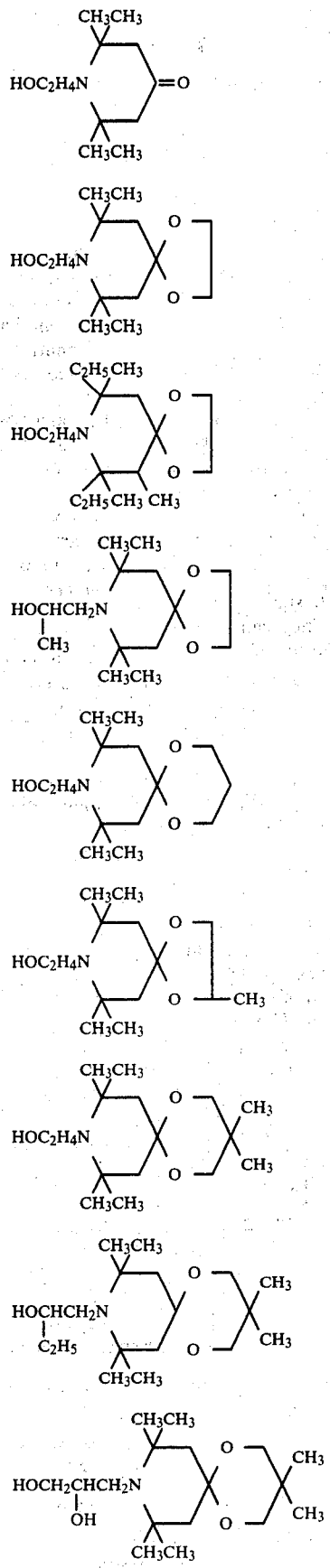

-continued

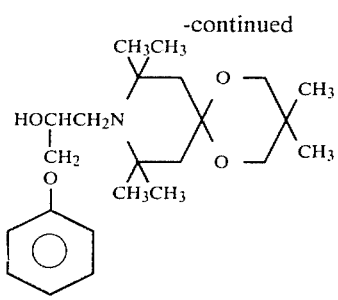
26.

The unsaturated carboxylic acid esters of the second class are esters of any of the above unsaturated acids with an aliphatic, cycloaliphatic or aromatic alcohol or phenol having up to thirty carbon atoms, such as methanol, ethanol, propanol, isopropanol, butanol, isobutanol, sec-butanol, t-butanol, pentanol, hexanol, cyclohexanol, octanol, 2-ethylhexanol, decanol, isodecanol, lauryl alcohol, tridecanol, myristyl alcohol, stearyl alcohol, allyl alcohol, oleyl alcohol, glycidol; benzyl alcohol, phenol, cresol, xylenol, t-butyl phenol, octyl phenol, nonyl phenol, and cyclohexylphenol.

The polymeric light stabilizers of this invention can be prepared by polymerizing the unsaturated carboxylic acid ester alone or with another copolymerizable unsaturated monomer in the presence of a polymerization initiator or catalyst, such as an organic peroxide or organic azonitrile. They can also be prepared by transesterifying the polymer of the unsaturated carboxylic acid ester alone or with another unsaturated monomer containing no 2,2,6,6-tetraalkyl piperidyl group with the piperidyl compound represented by formula (I) or (II).

In forming copolymers, the molar ratio of unsaturated carboxylic acid to other unsaturated monomers may be within the range from 10:0 to 1:9.

The following Examples illustrate the procedure.

EXAMPLE I

Preparation of bis(1,2,2,6,6-pentamethyl-4-piperidyl)itaconate polymer

Bis(1,2,2,6,6-pentamethyl-4-piperidyl)itaconate 2.5 g was dissolved in 10 ml of toluene, and 0.08 g of dicumyl peroxide was added. The mixture was heated and stirred at 150° C. for ten hours. The solvent was distilled off, and a pale yellow solid was obtained.

M.W. = 1,200
Softening point 66° C.
N content = 6.2%.

EXAMPLE II

Preparation of bis(1,2,2,6,6-pentamethyl-4-piperidyl)itaconate/decene-1 copolymer Bis(1,2,2,6,6-pentamethyl-4-piperidyl)itaconate 2.6 g (6 mmole), decene-1 0.6 g (4.3 mmole) and dicumyl peroxide 0.05 g were dissolved in 14 ml of toluene and heated and stirred at 150° C. for seven hours. The solvent was distilled off, and a pale yellow solid was obtained.

M.W. = 1,500
Softening point 54° C.
N content = 5.9%.

EXAMPLE III

Preparation of bis(1,2,2,6,6-pentamethyl-4-piperidyl)tetrahydrophthalate/bis(1,2,2,6,6-pentamethyl-4-piperidyl)fumarate copolymer Bis(1,2,2,6,6-pentamethyl-4-piperidyl)tetrahydrophthalate 1.3 g (1/370 mole), bis(1,2,2,6,6-pentamethyl-4-piperidyl)fumarate 2.1 g (1/200 mole) and dicumyl peroxide 0.034 g were heated and stirred at 150° C. for eight hours, and then cooled to obtain a pale yellow solid.

M.W. = 5,400
Softening point 72° C.
N content = 6.4%.

EXAMPLE IV

Preparation of dimethyl tetrahydrophthalate/bis(1,2,2,6,6-pentamethyl-4-piperidyl)fumarate copolymer Dimethyl tetrahydrophthalate 0.8 g (1/300 mole), bis(1,2,2,6,6-pentamethyl-4-piperidyl)fumarate 2.1 g (1/200 mole) and 0.029 g of dicumyl peroxide were heated and stirred at 150° C. for five hours, and then cooled to obtain a pale yellow solid.

M.W. = 3,800
Softening point 65° C.
N content = 5.3%.

Using the same procedure as in Examples I to IV, the polymers and copolymers shown in Table A were obtained:

TABLE A

| Example No. | Unsaturated carboxylic acid ester | Comonomer | Molar ratio | M.W. | Softening point (°C.) | N Content (%) |
| --- | --- | --- | --- | --- | --- | --- |
| I | Bis(1,2,2,6,6-pentamethyl-4-piperidyl) itaconate | — | | 1200 | 66 | 6.2 |
| II | Bis(1,2,2,6-6-pentamethyl-4-piperidyl) itaconate | Decene-1 | 2:3 | 1500 | 54 | 5.9 |
| III | Bis(1,2,2,6,6-pentamethyl-4-piperidyl)tetrahydrophthalate | Bis(1,2,2,6,6-pentamethyl-4-piperidyl)fumarate | 2:1 | 5400 | 72 | 6.4 |
| IV | Dimethyl tetrahydrophthalate | Bis(1,2,2,6,6-pentamethyl-4-piperidyl)fumarate | 2:3 | 3800 | 65 | 5.3 |
| V | Tris(1,2,2,6,6-pentamethyl-4-piperidyl)-3-butene-1,2,3-tricarboxylate | — | | 2700 | 63 to 78 | 6.9 |
| VI | Tris(1,2,2,6,6-pentamethyl-4-piperidyl)-3-butene-1,2,3-tricarboxylate | Butyl acrylate | 2:1 | 3700 | 75 to 93 | 6.1 |
| VII | Bis(3-ethyl-9-aza-8,8,10,10- | — | | 2500 | 58 to 69 | 3.6 |

TABLE A-continued

| Example No. | Unsaturated carboxylic acid ester | Comonomer | Molar ratio | M.W. | Softening point (°C.) | N Content (%) |
|---|---|---|---|---|---|---|
| VIII | tetramethyl-9-(2,3-epoxypropyl) 1,5-dioxaspiro [5,5]-3-undecyl-methyl)-2-methylene glutarate Bis(2,2,6,6-tetramethyl-1-hydroxyethyl-4-piperidyl) dodecenyl succinate | Bis(1,2,2,6,6-pentamethyl-4-piperidyl) fumarate | 1:1 | 4300 | 80 to 104 | 5.3 |
| IX | Tris(9-aza-3,3,8,8,10,10-hexamethyl-1,5-dioxaspiro [5,5]-9-undecylethyl-1-hexene-2,4,6-tricarboxylate | Dimethyl maleate | 1:1 | 4600 | 83 to 97 | 3.5 |
| X | 1,2,3,6-Tetramethyl-2,6-diethyl-4-piperidyl-3-cyclohexene carboxylate | Bis(1,2,2,6,6-pentamethyl-4-piperidyl) fumarate | 1:2 | 4100 | 67 to 88 | 6.2 |
| XI | Ethyl-3,3,5,5-tetramethyl-4-aza-1-cyclohexene carboxylate | Bis(1,2,2,6,6-pentamethyl-4-piperidyl) fumarate | 1:1 | 2600 | 48 to 59 | 6.6 |
| XII | Bis(8,8,10,10-tetramethyl-9-aza-3-ethyl-1,5-dioxaspiro [5,5]-3-undecylmethyl) tetrahydrophthalate | Acrylonitrile | 1:1 | 2300 | 53 to 76 | 5.9 |
| XIII | Bis(8-aza-6,7,9-trimethyl-7,9-diethyl-1,4-dioxaspiro [4,5]-8-decylethyl)tetrahydrophthalate | Bis(1,2,2,6,6-pentamethyl-4-piperidyl) maleate | 1:1 | 5200 | 77 to 118 | 4.9 |
| XIV | Bis(2,2,6,6-tetramethyl-1-benzyl-4-piperidyl)-endomethylenetetrahydrophthalate | 2,2,6,6-tetramethyl-1-benzyl-4-piperidyl acrylate | 1:2 | 3400 | 54 to 67 | 4.5 |
| XV | Bis(2,2,6,6-tetramethyl-1-piperidylethyl)endomethylene tetrahydrophthalate | Methyl methacrylate | 1:1 | 1900 | 45 to 62 | 4.3 |
| XVI | Trimethyl-methylcyclohexene tricarboxylate | Bis(1,2,2,6,6-pentamethy-4-piperidyl) fumarate | 1:1 | 3900 | 57 to 76 | 4.2 |
| XVII | Tris(1,2,2,6,6-pentamethyl-4-piperidyl)methylcyclohexene tricarboxylate | Bis(1,2,2,6,6-pentamethyl-4-piperidyl) fumarate | 1:1 | 5600 | 64 to 124 | 6.4 |
| XVIII | 1,2,2,6,6-Pentamethyl-4-piperidyl-2,4-hexadienoate | Bis(1,2,2,6,6-pentamethyl-4-piperidyl) fumarate | 1:1 | 1100 | 41 to 48 | 6.1 |
| XIX | 2-Hydroxy-3-(2,2,6,6-tetramethyl-1-piperidyl) propyl-3,8-nonadienoate | 1,2,2,6,6-pentamethyl-4-piperidyl) acrylate | 1:2 | 1400 | 46 to 58 | 5.4 |
| XX | 1-Methyl-2-(2,2,6,6-tetramethyl-4-oxo-1-piperidyl) ethyl oleate | Bis(1,2,2,6,6-pentamethyl-4-piperidyl) fumarate | 1:2 | 1600 | 45 to 62 | 3.3 |
| XXI | 7,7,8,9,9-Pentamethyl-8-aza-1,4-dioxaspiro [4,5]-2-decylmethyl linoleate | Bis(1,2,2,6,6-pentamethyl-4-piperidyl) fumarate | 1:2 | 1800 | 51 to 68 | 5.2 |
| XXII | 1,2,2,6,6-Pentamethyl-4-piperidyl ricinoleate | Bis(1,2,2,6,6-pentamethyl-4-piperidyl) fumarate | 1:2 | 1700 | 40 to 57 | 5.4 |

EXAMPLE XXIII

Dimethyl itaconate polymer (M.W.=1200) 2.7 g, 2,2,6,6-tetramethyl-4-piperidinol, 6.4 g, tetraisopropyl titanate 0.18 g and xylene 20 ml were heated at 190° C. for 8.5 hours under a nitrogen stream. Toluene was added, and the solution was treated with celite. Solvent and unreacted piperidinol were distilled under vacuum, and 3.7 g of a pale brown solid was obtained.

M.W.=2000
N content 4.5%
Softening point 43° to 50° C.

The stabilizers shown in Table B below were prepared by the same procedure.

TABLE B

| Example No. | Polymer | Piperidine compound | M.W. | Softening point (°C.) | N Content (%) |
|---|---|---|---|---|---|
| XXIV | Dimethylmaleate dimethyl tetrahydrophthalate copolymer (3:2) (M.W. = 1600) | 2,2,6,6-Tetramethyl-4-piperidinol | 3500 | 56 to 82 | 6.1 |
| XXV | Dimethylmaleate dimethyl tetrahydrophthalate copolymer (3:2) (M.W. = 1600) | 9-Aza-8,8,10,10-tetra methyl-3-ethyl-1,5-dioxspiro [5,5]-3-undecyl methanol | 4800 | 61 to 88 | 3.9 |
| XXVI | Dimethylmaleate dimethyl tetrahydrophthalate copolymer (3:2) (M.W. = 1600) | 9-Aza-9-(2-hydroxybutyl)-3,3,8,8,10,10-hexamethyl-1,5-dioxaspiro [5,5]undecane | 5700 | 71 to 107 | 3.6 |
| XXVII | Diethylmethylene glutarate ethylacrylate copolymer | 2,2,6,6-Tetramethyl-4-piperidinol | 1900 | 48 to 55 | 5.8 |

TABLE B-continued

| Example No. | Polymer | Piperidine compound | M.W. | Softening point (°C.) | N Content (%) |
|---|---|---|---|---|---|
| XXVIII | Diethylmethylene glutarate ethylacrylate copolymer (1:1) (M.W. = 900) | 1-(2,3-Epoxypropyl)-2,2,6,6-tetramethyl-4-piperidinol | 2200 | 43 to 49 | 4.6 |
| XXIX | Dimethyl fumarate dimethyl endomethylene tetrahydro-phthalate copolymer (2:1) (M.W. = 1500) | 2,2,6,6-Tetramethyl-4-piperidinol | 3200 | 53 to 64 | 5.9 |
| XXX | Dimethyl itaconate (M.W. = 1200) | 9-Aza-8,8,10,10-tetramethyl-3-ethyl-1,5-dioxaspiro [5,5]-3-undecyl methanol | 4100 | 66 to 97 | 4.1 |
| XXXI | Dimethyl itaconate dodecene-1 copolymer (1:1) (M.W. = 1300) | 2,2,6,6-Tetramethyl-4-piperidinol | 2000 | 47 to 55 | 3.9 |

Small amounts of the stabilizer of this invention when combined with synthetic resin improve the light stability of resin. The amount of the stabilizer is generally within the range from about 0.001 to about 10 parts by weight, preferably from about 0.01 to about 5 parts by weight, per 100 parts by weight of resin.

Synthetic resins that can have their resistance to deterioration enhanced with the polymeric stabilizer compound according to this invention include α-olefin polymers such as polyethylene, polypropylene, polybutene, poly-3-methylbutene, or mixtures thereof and with copolymers other monomers such as ethylene-vinyl acetate copolymer; ethylene-propylene copolymer; polystyrene; polyvinyl acetate; polyacrylic esters; copolymers from styrene and another monomer (for example, maleic anhydride, butadiene, and acrylonitrile); acrylonitrile-butadiene-styrene copolymer, acrylic acid ester-butadiene-styrene copolymer, methacrylic acid ester-butadiene-styrene copolymer, polymethacrylate esters such as polymethacrylate; polyvinyl alcohol; polyvinyl formal; polyvinyl butyral; linear polyesters, polyamides; polycarbonates; polyacetals; polyurethanes; cellulosic resins; phenol-formaldehyde resins; urea-formaldehyde resins; melamine-formaldehyde resins; epoxy resins; unsaturated polyester resins; silicone resins; halogen-containing resins such as polyvinyl chloride, polyvinylidene chloride, polyvinylidene fluoride, and copolymers thereof, and rubbers such as isoprene rubber, butadiene rubber, epichlorohydrin rubber, chloroprene rubber, and blends of any of the above.

The polymeric 2,2,6,6-tetraalkyl piperidyl stabilizers of the invention can be combined with conventional heat stabilizers such as phenolic antioxidant polyvalent metal salts of organic acids, organic phosphites, thioethers and other known heat stabilizers, thereby constituting light and heat stabilizer compositions of the invention.

The phenolic antioxidant contains one or more phenolic hydroxyl groups, and one or more phenolic nuclei, and can contain from about eight to about three hundred carbon atoms. In addition, the phenolic nucleus can contain an oxy or thio ether group.

The alkyl-substituted phenols and polynuclear phenols, because of their molecular weight, have a higher boiling point, and therefore are preferred because of their lower volatility. There can be one or a plurality of alkyl groups of one or more carbon atoms. The alkyl group or groups including any alkylene groups between phenol nuclei preferably aggregate at least four carbon atoms. The longer the alkyl or alkylene chain, the better the compatibility with polypropylene, inasmuch as the phenolic compound then acquires more of an aliphatic hydrocarbon character, and therefore there is no upper limit on the number of alkyl carbon atoms. Usually, from the standpoint of availability, the compound will not have more than about eighteen carbon atoms in an alkyl, alicyclidene and alkylene group, and a total of not over about fifty carbon atoms. The compounds may have from one to four alkyl radicals per phenol nucleus.

The phenol contains at least one and preferably at least two phenolic hydroxyls, the two or more hydroxyls being in the same ring, if there is only one. In the case of bicyclic phenols, the rings can be linked by thio or oxyether groups, or by alkylene, alicyclidene or arylidene groups.

The monocyclic phenols which can be employed have the structure:

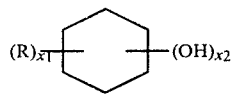

R is selected from the group consisting of hydrogen; halogen; and organic radicals containing from one to about thirty carbon atoms, such as alkyl, aryl, alkenyl, alkaryl, aralkyl, cycloalkenyl, cycloalkyl, alkoxy, and acyl

where R' is aryl, alkyl or cycloalkyl.

$x_1$ and $x_2$ are integers from one to four, and the sum of $x_1$ and $x_2$ does not exceed six.

The polycyclic phenol phenol is one having at least two aromatic nuclei linked by a polyvalent linking radical, as defined by the formula:

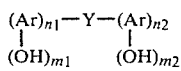

wherein

Y is a polyvalent linking group selected from the group consisting of oxygen; carbonyl; sulfur; sulfinyl; aromatic, aliphatic and cycloaliphatic hydrocarbon groups; and oxyhydrocarbon, thiohydrocarbon and heterocyclic groups. The linking group can have from one up to twenty carbon atoms.

Ar is a phenolic nucleus which can be a phenyl or a polycarbocyclic group having condensed or separate phenyl rings; each Ar group contains at least one free phenolic hydroxyl group up to a total of five. The Ar rings can also include additional rings connected by additional linking nuclei of the type Y, for example, Ar—Y—Ar—Y—Ar.

$m_1$ and $m_2$ are numbers from one to five, and $n_1$ and $n_2$ are numbers of one or greater, and preferably from one to four.

The aromatic nucleus Ar can, in addition to phenolic hydroxyl groups, include one or more inert substituents. Examples of such inert substituents include hydrogen, halogen atoms, e.g., chlorine, bromine and fluorine; organic radicals containing from one to about thirty carbon atoms, such as alkyl, aryl, alkaryl, aralkyl, cycloalkenyl, cycloalkyl, alkoxy, aryloxy and acyloxy

where R' is aryl, alkyl or cycloalkyl, or thiohydrocarbon groups having from one to about thirty carbon atoms, and carboxyl

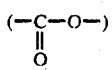

groups. Usually, however, each aromatic nucleus will not have more than about eighteen carbon atoms in any hydrocarbon substituent group. The Ar group can have from one to four substituted groups per nucleus.

Typical aromatic nuclei include phenyl, naphthyl, phenanthryl, triphenylenyl, anthracenyl, pyrenyl, chrysenyl, and fluoroenyl groups.

When Ar is a benzene nucleus, the polyhydric polycyclic phenol has the structure:

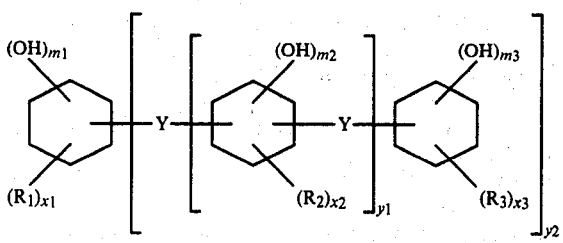

wherein $R_1$, $R_2$ and $R_3$ are inert substituent groups as described in the previous paragraph;

$m_1$ and $m_3$ are integers from one to a maximum of five;

$m_2$ is an integer from one to a maximum of four;

$x_1$ and $x_3$ are integers from zero to four, and $x_2$ is an integer from zero to three;

$y_1$ is an integer from zero to about six and $y_2$ is an integer from one to five, preferably one or two.

Preferably, the hydroxyl groups are located ortho and/or para to Y.

Exemplary Y groups are alkylene, alkylidene, and alkenylene; arylene, alkyl arylene, arylalkylene; cycloalkylene, cycloalkylidene; and oxa- and thia-substituted such groups; tetrahydrofuranes, esters and triazino groups. The Y groups are usually bi, tri, or tetravalent, connecting two, three or four Ar groups. However, higher valency Y groups connecting more than four Ar groups, can also be used. According to their constitution, the Y groups can be assigned to subgenera as follows:

(1) Y groups where at least one carbon in a chain or cyclic arrangement connect the aromatic groups, such as:

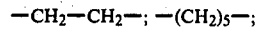

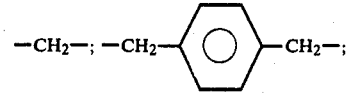

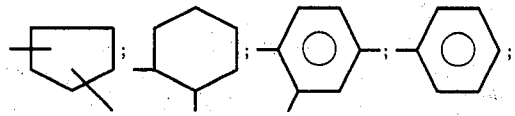

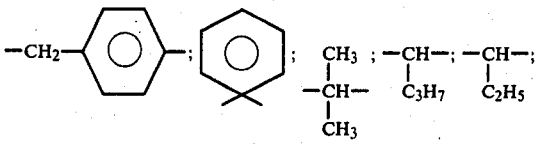

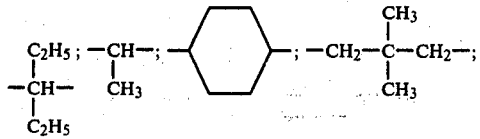

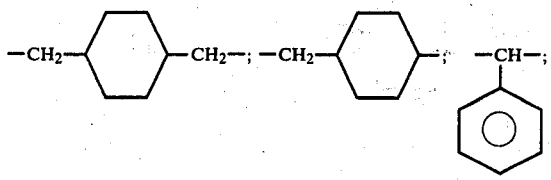

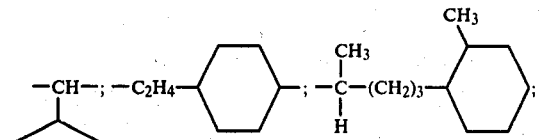

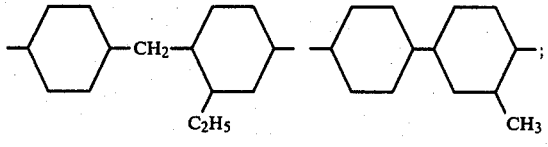

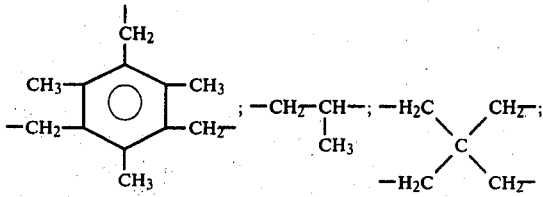

-continued

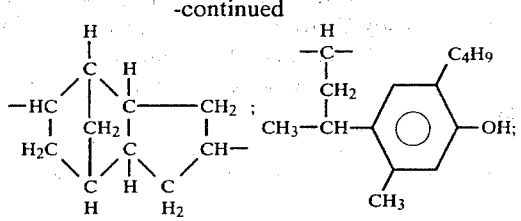

(2) Y groups where only atoms other than carbon link the aromatic rings, such as —O—, —S—,

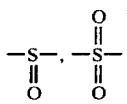

and —(S)$_x$— where x is a number from one to ten;

(3) Y groups made up of more than a single atom including both carbon and other atoms linking the aromatic nuclei, such as:

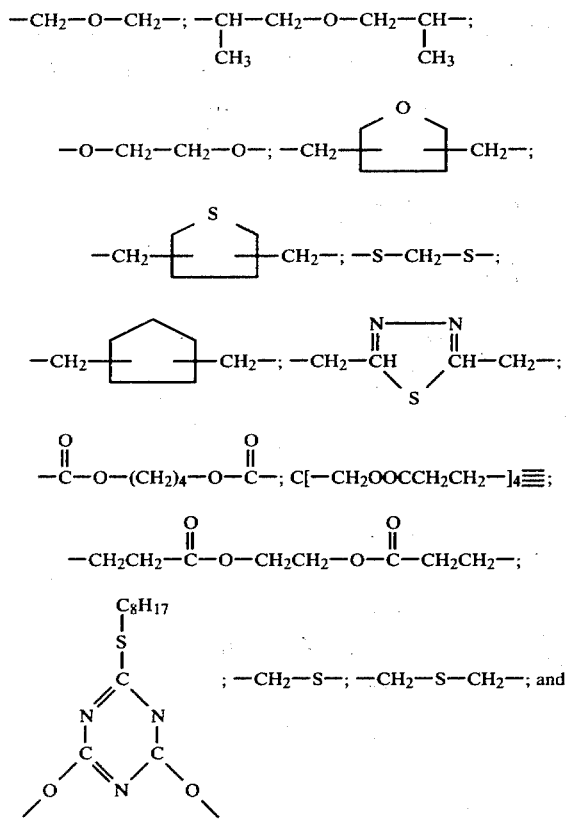

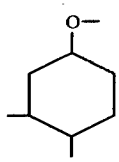

Although the relation of effectiveness to chemical structure is insufficiently understood, many of the most effective phenols have Y groups of subgenus (1), and accordingly this is preferred. Some of these phenols can be prepared by the alkylation of phenols or alkyl phenols with polyunsaturated hydrocarbons such as dicyclopentadiene or butadiene.

Representative phenols include guaiacol, resorcinol monoacetate, vanillin, butyl salicylate, 2,6-di-tert-butyl-4-methyl phenol, 2-tert-butyl-4-methoxy phenol, 2,4-dinonyl phenol, 2,3,4,5-tetradecyl phenol, tetrahydro-α-naphthol, o-, m- and p-cresol, o-, m- and p-phenyl-phenol, o-, m- and p-xylenols, the carvenols, symmetrical xylenol, thymol, o-, m- and p-nonylphenol, o-, m- and p-dodecyl-phenol, and o-, m- and p-octyl-phenol, o-, and m-tert-butyl-p-hydroxy-anisole, p-n-decyloxy-phenol, p-n-decyloxy-cresol, nonyl-n-decyloxy-cresol, eugenol, isoeugenol, glyceryl monosalicylate, methyl-p-hydroxy-cinnamate, 4-benzyloxy-phenol, p-acetylaminophenol, p-stearyl-aminophenol, methyl-p-hydroxybenzoate, p-di-chlorobenzoyl-aminophenol, p-hydroxysalicyl anilide, stearyl-(3,5-di-methyl-4-hydroxy-benzyl)thioglycolate, stearyl-β-(4-hydroxy-3,5-di-t-butylphenyl)propionate, distearyl-3,5-di-t-butyl-4-hydroxybenzylphosphonate, and distearyl-(4-hydroxy-3-methyl-5-t-butyl)benzylmalonate.

Exemplary polyhydric phenols are orcinol, propyl gallate, catechol, resorcinol, 4-octyl-resorcinol, 4-dodecyl-resorcinol, 4-octadecyl-catechol, 4-isooctyl-phloroglucinol, pyrogallol, hexahydroxybenzene, 4-isohexyl-catechol, 2,6-ditertiary-butyl-resorcinol, 2,6-di-isopropyl-phloroglucinol.

Exemplary polyhydric polycyclic phenols are methylene bis-(2,6-di-tertiary-butyl-phenol), 2,2-bis-(4-hydroxy phenyl)-propane, methylene-bis-(p-cresol), 4,4'-benzylidene bis (2-tertiary-butyl-5-methyl-phenol), 4,4'-cyclo-hexylidene-bis-(2-tertiary-butylphenol), 2,2'-methylene-bis-(4-methyl-6-(1'-methyl-cyclohexyl)-phenol), 2,6-bis-(2'-hydroxy-3'-tertiary-butyl-5'-methyl-benzyl)-4-methylphenol, 4,4'-bis-(2-tertiary-butyl-5-methyl-phenol), 2,2'-bis-(4-hydroxy-phenyl) butane, ethylene bis-(p-cresol), 4,4'-oxobis-phenol, 4,4'-oxobis-(3-methyl-5-isopropyl-phenol), 4,4'-oxobis-(3-methyl-phenol), 2,2'-oxobis-(4-dodecyl-phenol), 2,2'-oxobis-(4-methyl-5-tertiary-butyl-phenol), 4,4'-thio-bis-phenol; 4,4'-thio-bis-(3-methyl-6-tertiary-butyl-phenol), 2,2'-thio-bis-(4-methyl-6-tertiary-butyl-phenol), 4,4'-n-butylidene-(2-t-butyl-5-methyl-phenol), 2,2'-methylene-bis-(4-methyl-6-(1'-methyl-cyclohexyl)-phenol), 4,4'-cyclohexylene bis-(2-tertiary-butyl-phenol), 2,6-bis-(2'-hydroxy-3'-t-butyl-5'-methyl-benzyl)-4-methyl-phenol, 4,4'-oxobis (naphthalene-1,5-diol), 1,3'-bis-(naphthalene-2,5-diol) propane, and 2,2'-butylene bis-(naphthalene-2,7-diol), (3-methyl-5-tert-butyl-4-hydroxy-phenyl)-4'-hydroxy-phenyl) propane, 2,2'-methylene-bis-(4-methyl-5-isopropylphenol), 2,2'-methylene-bis-(4-methyl-5-isopropylphenol), 2,2'-methylene-bis-(5-tert-butyl-4-chlorophenol), (3,5-di-tert-butyl-4-hydroxyphenyl)-(4'-hydroxyphenyl) ethane, (2-hydroxyphenyl)-(3',5'-di-tert-butyl-4',4-hydroxyphenyl) ethane, 2,2'-methylene-bis-(4-octylphenol), 4,4'-propylene-bis-(2-tert-butyl-phenol), 2,2'-isobutylene-bis-(4-nonyl-phenol), 2,4-bis-(4-hydroxy-3-t-butyl-phenoxy)-6-(n-octylthio)-1,3,5-triazine, 2,4,6-tris-(4-hydroxy-3-t-butyl-phenoxy)-1,3,5-triazine, 2,2'-bis-(3-t-butyl-4-hydroxyphenyl) thiazolo-(5,4-d) thiazole, 2,2'-bis-(3-methyl-5-t-butyl-4-hydroxyphenyl) thiazolo-(5,4-d)-thiazole, 4,4'-bis-(4-hydroxyphenyl) pentanoic acid octadecyl ester, cyclopentylene-4,4'-bis-phenol, 2-ethylbutylene-4,4'-bisphenol, 4,4'-cyclooctylene-bis-(2-cyclohexylphenol), β,β-thiodiethanol-bis-(3-tert-butyl-4-hydroxyphenoxy acetate), 1,4-butanedio-bis-(3-tert-butyl-4-hydroxyphenoxy acetate), pentaerythritol tetra-(4-hydroxyphenol propionate), 2,4,4'-tri-hydroxy benzophenone, bis-(2-tert-butyl-3-hydroxy-5-methylphenyl) sulfide, bis-(2-tert-butyl-4-hydroxy-5-methylphenyl) sulfide, bis-(2-tert-butyl-4-hydroxy-5-methylphenyl) sulfoxide, bis-(3-ethyl-5-tert-butyl-4-hydroxybenzyl) sulfide, bis-(2-hydroxy-4-methyl-6-tert-butyl-phenyl) sulfide, 4,4'-bis-(4-hydroxyphenol) pentanoic acid octadecyl thiopropionate ester, 1,1,3-tris-(2'-methyl-4-hydroxy-5'-tert-butylphenyl) butane, 1,1,3-tris-(1-methyl-3-hydroxy-4-tert-butylphenyl) butane, 1,8-bis-(2-hydroxy-5-methylbenzoyl-n-octane, 2,2'-ethylene-bis-[4'-(3-tert-butyl-4-hydroxyphenyl)-thiazole], 1-methyl-3-(3-methyl-5-tert-butyl-4-hydroxybenzyl)naphthalene, 2,2'-(2-butene)-bis-(4-methoxy-6-tert-butylphenol)-bis-[3,3-bis-(4-hydroxy-3-t-butylphenyl) butyric acid] glycol ester, 4,4'-butylidene-bis-(6-t-butyl-m-cresol), 1,1,3-tris-(2-methyl-4-hydroxy-5-t-butylphenyl) butane, 1,3,5-tris-(3,5-di-t-butyl-4-hydroxybenzyl)-2,4,6-trimethylbenzene, tetrakis[methylene-3-(3,5-di-t-butyl-4-hydroxyphenyl)propionate] methane, 1,3,5-tris-(3,5-di-t-butyl-4-hydroxybenzyl) isocyanurate, 1,3,5-tris-(3,5-di-t-butyl-4-hydroxyphenyl) propionyl-oxyethyl isocyanurate, 2-octylthio-4,6-di-(4-hydroxy-3,5-di-t-butyl) phenoxy-1,3,5-triazine, 4,4'-thiobis-(6-t-butyl-m-cresol) and pentaerythritol hydroxyphenyl propionate.

A particularly desirable class of polyhydric polycyclic phenols are the dicyclopentadiene polyphenols, which are of the type:

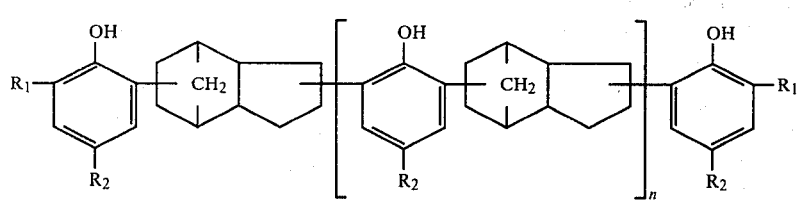

in which $R_1$ and $R_2$ are lower alkyl, and can be the same or different, and n is the number of the groups enclosed by the brackets, and is usually from 1 to about 5. These are described in U.S. Pat. No. 3,567,683, dated Mar. 2, 1971 to Spacht. A commercially available member of this class is Wingstay L, exemplified by dicyclopentadiene tri-(2-tert-butyl-4-methyl-phenol) of the formula:

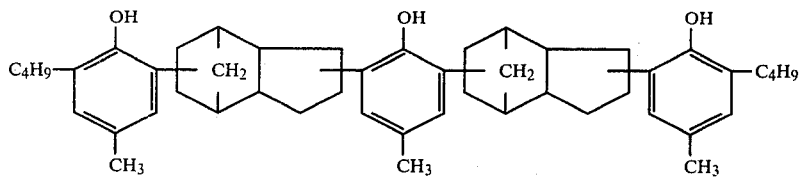

The polyhydric polycyclic phenols used in the invention can also be condensation products of phenols or alkylphenols with hydrocarbons having a bicyclic ring structure and a double bond or two or more double bonds, such as α-pinene, β-pinene, dipentene, limonene, vinylcyclohexene, dicyclopentadiene, allo-ocimene, isoprene and butadiene. These condensation products are usually obtained under acidic conditions in the form of more or less complex mixtures of monomeric and polymeric compounds. However, it is usually not necessary to isolate the individual constituents. The entire reaction product, merely freed from the acidic condensation catalyst and unchanged starting material, can be used with excellent results. While the exact structure of these phenolic condensation products is uncertain, the Y groups linking the phenolic nuclei all fall into the preferred subgenus 1. For method of preparation, see e.g., U.S. Pat. No. 3,124,555, U.S. Pat. No. 3,242,135, and British Pat. No. 961,504.

When the stabilizer composition is used in conjunction with a polyvalent metal salt of an organic acid, the organic acid will ordinarily have from about six to about twenty-four carbon atoms. The polyvalent metal can be any metal of Group II of the Periodic Table, such as zinc, calcium, cadmium, barium, magnesium and strontium. The alkali metal salts and heavy metal salts such as lead salts are unsatisfactory. The acid can be any organic non-nitrogenous monocarboxylic acid having from six to twenty-four carbon atoms. The aliphatic, aromatic, alicyclic and oxygen-containing heterocyclic organic acids are operable as a class. By the term "aliphatic acid" is meant any open chain carboxylic acid, substituted, if desired, with nonreactive groups, such as halogen, sulfur and hydroxyl. By the term "alicyclic" it will be understood that there is intended any cyclic acid in which the ring is nonaromatic and composed solely of carbon atoms, and such acids may if desired have inert, nonreactive substituents such as halogen, hydroxyl, alkyl radicals, alkenyl radicals and other carbocyclic ring structures condensed therewith. The oxygen-containing heterocyclic compounds can be aromatic or nonaromatic and can include oxygen and carbon in the ring structure, such as alkyl-substituted furoic acid. The aromatic acids likewise can have nonreactive ring substituents such as halogen, alkyl and alkenyl groups, and other saturated or aromatic rings condensed therewith.

As exemplary of the acids which can be used in the form of their metal salts there can be mentioned the following: hexoic acid, 2-ethylhexoic acid, n-octoic acid, isooctoic acid, capric acid, undecylic acid, lauric acid, myristic acid, palmitic acid, margaric acid, stearic acid, oleic acid, ricinoleic acid, behenic acid, chlorocaproic acid, hydroxy capric acid, benzoic acid, phenylacetic acid, butyl benzoic acid, ethyl benzoic acid, propyl benzoic acid, hexyl benzoic acid, salicyclic acid, naphthoic acid, 1-naphthalene acetic acid, orthobenzoyl benzoic acid, naphthenic acids derived from petroleum, abietic acid, dihydroabietic acid, hexahydrobenzoic acid, and methyl furoic acid.

The water-insoluble salts are preferred, because they are not leached out when the plastic is in contact with water. Where these salts are not known, they are made by the usual types of reactions, such as by mixing the acid, or anhydride with the corresponding oxide or hydroxide of the metal in a liquid solvent, and heating, if necessary, until salt formation is complete.

A variety of organic triphosphites and acid phosphites can be employed, of which the following are exemplary.

The organic triphosphite can be any organic phosphite having three or more organic radicals attached to phosphorus through oxygen. The acid phosphite can be any organic phosphite having one or two organic radicals attached to phosphorus through oxygen. These radicals can be monovalent radicals, in the case of the triphosphites, diphosphites and monophisphites.

The organic triphosphites in which the radicals are monovalent radicals can be defined by the formula:

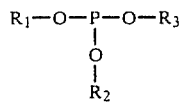

in which $R_1$, $R_2$ and $R_3$ are selected from the group consisting of alkyl, alkenyl, aryl, alkaryl, aralkyl, and cycloalkyl groups having from one to about thirty carbon atoms.

The acid phosphites are defined by the same formula, but one or two of $R_1$, $R_2$ and $R_3$ is hydrogen or a cation of a metal or ammonium.

Also included are the organic triphosphites having a bivalent organic radical forming a heterocyclic ring with the phosphorus of the type:

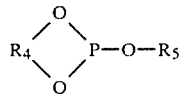

in which $R_4$ is a bivalent organic radical selected from the group consisting of alkylene, arylene, aralkylene, alkarylene and cycloalkylene radicals having from two to about thirty carbon atoms, and $R_5$ is a monovalent organic radical as defined above in the case of $R_1$, $R_2$ and $R_3$;

$R_5$ is hydrogen or a cation, in the case of the acid phosphites.

Also useful organic triphosphites are mixed heterocyclic-open chain phosphites of the type:

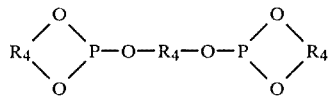

More complex triphosphites are formed from trivalent organic radicals, of the type:

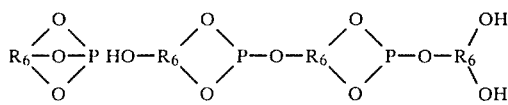

in which $R_6$ is a trivalent organic radical of any of the types of $R_1$ to $R_5$, inclusive, as defined above.

A particularly useful class of complex triphosphites are the tetraoxadiphosphaspiro undecanes of the formula:

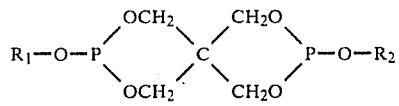

where $R_1$ and $R_2$ are selected from the group consisting of aryl, alkyl, aryloxyethyl, alkyloxyethyl, aryloxyethoxyethyl, alkyloxyethoxyethyl and alkyloxypolyethoxyethyl having from about 1 to about 30 carbon atoms.

In the case of the acid phosphites, one or both of $R_1$ and $R_2$ is also hydrogen or a cation.

An especially preferred class of organic triphosphites and acid phosphites have a bicyclic aromatic group attached to phosphorus through oxygen, with no or one or more phenolic hydroxyl groups on either or both of the aromatic rings. These phosphites are characterized by the formula;

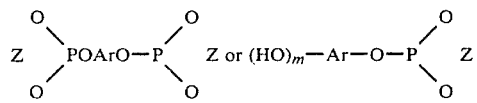

in which Ar is a mono or bicyclic aromatic nucleus and m is an integer of from 0 to about 5. $Z$ is one or a plurality of organic radicals as defined above for $R_1$ to $R_6$, taken singly or together in sufficient number to satisfy the valences of the two phosphite oxygen atoms.

One or both $Z$ radicals is also hydrogen, in the case of the acid phosphites, and can include additional bicyclic aromatic groups of the type $(HO)_m$—Ar.

The cation in the case of acid phosphites can be a metal, such as an alkali metal, for instance, sodium, potassium or lithium; an alkaline earth metal, for instance, barium, calcium, or a nontoxic polyvalent metal, such as magnesium, tin and zinc.

Usually, the triphosphites and acid phosphites will not have more than about sixty carbon atoms.

Exemplary triphosphites are monophenyl di-2-ethylhexyl phosphite, diphenyl mono-2-ethylhexyl phosphite, di-isooctyl monotolyl phosphite, tri-2-ethylhexyl phosphite, phenyl dicyclohexyl phosphite, phenyl diethyl phosphite, triphenyl phosphite, tricresyl phosphite, tri(dimethylphenyl)phosphite, trioctadecyl phosphite, triisooctyl phosphite, tridodecyl phosphite, isooctyl diphenyl phosphite, diisooctyl phenyl phosphite, tri(t-octylphenyl)phosphite, tri-(t-nonylphenyl)phosphite, benzyl methyl isopropyl phosphite, butyl dicresyl phosphite, isooctyl di(octylphenyl)phosphite, di(2-ethylhexyl)(isooctylphenyl)phosphite, tri(2-cyclohexylphenyl)phosphite), tri-α-naphthyl phosphite, tri(-phenylphenyl)phosphite, tri(2-phenylethyl)phosphite, ethylene phenyl phosphite, ethylene t-butyl phosphite, ethylene isohexyl phosphite, ethylene isooctyl phosphite, ethylene cyclohexyl phosphite, 2-phenoxy-1,3,2-dioxaphosphorinane, 2-butoxy-1,3,2-dioxyphosphorinane, 2-octoxy-5,5-dimethyl-dioxaphosphorinane, and 2-cyclohexyloxy-5,5-diethyl dioxaphosphorinane.

Exemplary pentaerythritol triphosphites are 3,9-diphenoxy-2,4,8,10-tetraoxa-3,9-diphosphaspiro-(5,5)- undecane (diphenyl-pentaerythritol diphosphite), 3,9-di(decyloxy)-2,4,8,10-tetraoxa-3,9-diphosphaspiro (5,5)-undecane, 3,9-di(isodecyloxy)-2,4,8,10-tetraoxa-3,9-diphosphaspiro-(5,5)-undecane, 3,9-di(octadecyloxy)-2,4,8,10-tetraoxa-3,9-diphosphaspiro-(5,5)-undecane, 3-phenoxy-9-isodecyloxy-2,4,8,10-tetraoxa-3,9-diphosphaspiro-(5,5)-undecane, 3,9-di(methoxy)-2,4,8,10-tetraoxa-3,9-diphosphaspiro-(5,5)-undecane, 3,9-di(-lauryloxy)-2,4,8,10-tetraoxa-3,9-diphosphaspiro-(5,5)-undecane, 3,9-di-p-tolyloxy-2,4,8,10-tetraoxa-3,9-diphosphaspiro-(5,5)-undecane, 3,9-di(methoxyethyloxy)-2,4,8,10-tetraoxa-3,9-diphosphaspiro-(5,5)-undecane, 3-methoxyethyloxy-9-isodecyloxy-2,4,8,10-tetraoxa-3,9-diphosphaspiro-(5,5)-undecane, 3,9-di(ethoxyethyloxy)-2,4,8,10-tetraoxa-3,9-diphosphaspiro-(5,5)-undecane, 3,9-di(butoxyethyloxy)-2,4,8,10-tetraoxa-3,9-diphosphaspiro-(5,5)-undecane, 3-methoxyethyloxy-9-butoxy-ethyloxy-2,4,8,10-tetraoxa-3,9-diphosphaspiro-(5,5)-undecane, 3,9-di(methoxyethoxyethyloxy)-2,4,8,10-tetraoxa-3,9-diphosphaspiro-(5,5)-undecane, 3,9-di(butoxyethoxyethyloxy)-2,4,8,10-tetraoxa-3,9-diphosphaspiro-(5,5)-undecane, 3,9-di(methoxyethoxyethoxyethyloxy)-2,4,8,10-tetraoxa-3,9-diphosphaspiro-(5,5)-undecane, 3,9-di(methoxy(polyethoxy)ethyloxy)-2,4,8,10-tetraoxa-3,9-diphosphaspiro-(5,5)-undecane (where the (polyethoxy)ethyloxy group has an average molecular weight of 350), 3,9-di(methoxy(polyethoxy)ethyloxy)-2,4,8,10-tetraoxa-3,9-diphosphaspiro-(5,5)-undecane (where the (polyethoxy)ethyloxy group has an average molecular weight of 550).

Exemplary of the bis aryl triphosphites are: bis(4,4'-thio-bis(2-tertiary-butyl-5-methyl-phenol))isooctyl phosphite, mono(4,4'-thio-bis(2-tertiary-butyl-5-methyl-phenol)) di-phenyl phosphite, tri-(4,4'-n-butylidene-bis(2-tertiary-butyl-5-methyl-phenol)) phosphite, (4,4'-benzylidene-bis(2-tertiary-butyl-5-methyl-phenol)) di-phenyl phosphite, isooctyl 2,2'-bis(-para-hydroxyphenyl)propane phosphite, decyl 4,4'-n-butylidene-bis(2-tertiary-butyl-5-methylphenol)phosphite, tri-4,4'-thio-bis(2-tertiary-butyl-5-methylphenol)phosphite, 2-ethylhexyl-2,2'-methylene-bis(4-methyl-6,1'-methylcyclohexyl)phenol phosphite, tri(2,2'-bis-(para-hydroxyphenyl)propane)phosphite, tri(4,4'-thio-bis(2-tertiary-butyl-5-methyl-phenol)phosphite, isooctyl-(2,6-bis(2'-hydroxy-3,5-dinonylbenzyl)-4-nonyl phenyl)) phosphite, tetra-tridecyl-4,4'-n-butylidene-bis(2-tertiary-butyl-5-methylphenyl)diphosphite, tetra-isooctyl-4,4'-thio-bis(2-tertiary-butyl-5-methylphenyl)diphosphite, 2,2'-methylene-bis(4-methyl-6,1'-methyl cyclohexyl phenyl)polyphosphite, isooctyl-4,4'-isopropylidene-bis-phenyl polyphosphite, 2-ethylhexyl-2,2'-methylene-bis(4-methyl-6,1'-methyl-cyclohexyl)phenyl triphosphite, tetra-tridecyl-4,4'-oxydiphenyl diphosphite, tetra-n-dodecyl-4,4'-n-butylidene bis(2-tertiary-butyl-5-methylphenyl)diphosphite, tetra-tridecyl-4,4'-isopropylidene bisphenyl diphosphite, hexa-tridecyl butane-1,1,3-tris(2'-methyl-5'-tertiary-butylphenyl-4')triphosphite.

Exemplary acid phosphites are di(phenyl)phosphite, monophenyl phosphite, mono(diphenyl)phosphite, dicresyl phosphite, di-(o-isooctylphenyl)phosphite, di(p-ethylhexylphenyl)phosphite, di(p-t-octylphenyl)phosphite, di(dimethylphenyl)phosphite, di-n-butyl phosphite, di-2-ethylhexyl phosphite, mono-2-ethylhexylphosphite, diisooctyl phosphite, monoisooctyl phosphite, monododecyl phosphite, 2-ethylhexyl phenyl phosphite, 2-ethylhexyl-(n-octylphenyl)phosphite, monocyclohexyl phosphite, dicyclohexyl phosphite, di(2-cyclohexyl phenyl)phosphite, di-α-naphthyl phosphite, diphenyl phenyl phosphite, di(diphenyl)phosphite, di-(2-phenyl ethyl)phosphite, dibenzyl phosphite, monobenzyl phosphite, n-butyl cresyl phosphite and didodecyl phosphite, cresyl phosphite, t-octylphenyl phosphite, ethylene phosphite, butyl cresyl phosphite, isooctyl monotolyl phosphite and phenyl cyclohexyl phosphite.

Exemplary of the bis aryl acid phosphites are: bis(4,4'-thio-bis(2-tertiary-butyl-5-methylphenol)) phosphite, (4,4'-thio-bis(2-tertiary-butyl-5-methylphenol)) phenyl phosphite, bis(4,4'-n-butylidene-bis(2-tertiary-butyl-5-methyl-phenol)) phosphite, mono(4,4'-benzylidene-bis(2-tertiary-butyl-5-methylphenol)) phosphite, mono(2,2'-bis-(parahydroxyphenyl)propane)phosphite, mono(4,4'-butylidene-bis(2-tertiary-butyl-5-methylphenol)phosphite, bis(4,4'-thio-bis(2-tertiary-butyl-5-methylphenol)) phosphite, mono-2-ethylhexyl-mono-2,2'-methylene-bis(4-methyl-6,1'-methylcyclohexyl)-phenol phosphite, bis(2,2'-bis(para-hydroxypheyl)-propane)phosphite, monoisooctyl-mono(4,4'-thio-bis(2-tertiary-butyl-5-methylphenol)) phosphite, isooctyl-(2,6-bis(2'-hydroxy-3,5-dinonylbenzyl)-4-nonylphenyl)) phosphite, tri-tridecyl-4,4'-n-butylidene-bis(2-tertiary-butyl-5-methylphenyl)diphosphite, triisooctyl-4,4'-thio-bis(2-tertiary-butyl-5-methylphenyl)diphosphite, bis(2,2'-methylene-bis(4-methyl-6,1'-methyl cyclohexyl phenyl)) phosphite, isooctyl-4,4'-isopropylidene-bisphenyl phosphite, monophenyl mono(2,2'-methylene-bis(4-methyl-6,1'-methyl-cycohexyl))triphosphite, di-tridecyl-4,4'-oxydiphenyl diphosphite, di-n-dodecyl-4,4'-n-butylidene-bis(2-tertiary-butyl-5-methylphenyl)-diphosphite, di-tridecyl-4,4'-isopropylidene bisphenyl diphosphite, tetra-tridecyl butane-1,1,3-tris(2'-methyl-5-tertiary-butylphenyl-4)-triphosphite.

The thiodipropionic acid ester has the following formula:

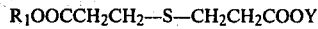

in which $R_1$ is an organic radical selected from the group consisting of hydrocarbon radicals such as alkyl, alkenyl, aryl, cycloalkyl and mixed alkyl aryl and mixed alkyl cycloalkyl radicals; hydroxyalkyl and hydroxyalkyloxyalkylene radicals; and esters thereof with aliphatic carboxylic acids; and Y is selected from the group consisting of (a) hydrogen, (b) a second R radical $R_2$, which can be the same as or different from the $R_1$ radical, (c) a polymeric chain of n thiodipropionic acid ester units:

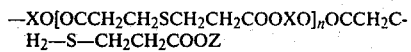

where Z is hydrogen, $R_2$ or M, n is the number of thiodipropionic acid ester units in the chain, and X is a bivalent hydrocarbon group of the type of $R_1$, that is, alkylene, alkenylene, cycloalkylene, mixed alkylene-arylene and mixed alkylene-cycloalkylene radicals; hydroxyalkylene and hydroxyalkyloxy-alkylene radicals; and esters thereof with aliphatic carboxylic acids; the value of n can range upwards from 0, but there is no upper limit on n except as is governed by the ratio of carbon atoms to sulfur atoms as stated below; and (d) a polyvalent metal M of Group II of the periodic table such as zinc, calcium, cadmium, barium, magnesium and strontium.

The molecular weights of the R and Y radicals are taken such that with the remainder of the molecule the thiodipropionic ester has a total of from about ten to about sixty carbon atoms per sulfur atom.

Accordingly, the various thiodipropionic acid ester species coming within the above-designated categories within the general formula can be defined as follows:

R₁OOCCH₂CH₂SCH₂CH₂COOH (a)

R₁OOCCH₂CH₂SCH₂CH₂COOR₂ (b)

R₁O[OCCH₂CH₂SCH₂CH₂COOX—O]-ₙOCCH₂CH₂SCH₂CH₂COOZ (c)

R₁OOCCH₂CH₂SCH₂CH₂COOM (d)

In the above formulae R₁ and R₂, M, X and Z are the same as before and the value of n₁ can range upwards from 1, but there is no upper limit on n₁ except as is imposed by the ratio of carbon atoms, as stated below. In the polymer (c), as in the other forms of thiodipropionic acid esters, the total number of carbon atoms per sulfur atom is within the range from about ten to about sixty.

The R radical of these esters is important in furnishing compatibility with the polymer. The Y radical is desirably a different radical, R₂ or M or a polymer, where R is rather low in molecular weight, so as to compensate for this in obtaining the optimum compatibility and nonvolatility. Where Y is a metal, the thiodipropionic acid ester furnishes the beneficial properties of the polyvalent metal salt which is described above.

The aryl, alkyl, alkenyl, and cycloalkyl groups may, if desired, contain inert, nonreactive substituents such as halogen and other carbocyclic and heterocyclic ring structures condensed therewith.

Typical R radicals are, for example, methyl, ethyl, propyl, isopropyl, butyl, isobutyl, t-butyl, amyl, isoamyl, n-octyl, osooctyl, 2-ethyl hexyl, t-octyl, decyl, dodecyl, octadecyl, allyl, hexenyl, linoleyl, ricinoleyl, oleyl, phenyl, xylyl, tolyl, ethylphenyl, naphthyl, cyclohexyl, benzyl, cyclopentyl, methylcyclohexyl, ethylcyclohexyl, and naphthenyl, hydroxyethyl, hydroxypropyl, glyceryl, sorbityl, pentaerythrityl, and polyoxyalkylene radicals such as those derived from diethylene glycol, triethylene glycol, polyoxypropylene glycol, poloxyethylene glycol, and polyoxypropyleneoxyethylene glycol, and esters thereof with any of the organic acids named below in the discussion of the polyvalent metal salts, including in addition those organic acids having from two to five carbon atoms, such as acetic, propionic, butyric and valeric acids.

Typical X radicals are alkylene radicals such as ethylene, tetramethylene, hexamethylene, decamethylene, alkyl-substituted alkylene radicals such as 1,2-propylene, $$-CH_2-\underset{\underset{CH_3}{|}}{\overset{\overset{CH_3}{|}}{C}}- \quad \text{and} \quad -CH_2-\underset{\underset{CH_3}{|}}{\overset{\overset{CH_3}{|}}{C}}-CH_2-$$

arylene radicals such as phenylene

methylenephenylene

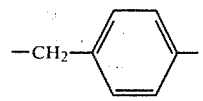

dimethylene phenylene

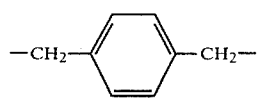

and alicyclylene such as cyclohexylene

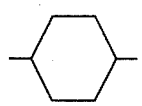

and cyclopentylene

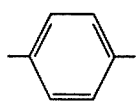

As exemplary of the thiodipropionic acid esters which can be used, there can be mentioned the following: monolauryl thiodipropionic acid, dilauryl thiodipropionate, butyl stearyl thiodipropionate, 2-ethylhexyl lauryl thiodipropionate, di-2-ethylhexyl-thiodipropionate, diisodecyl thiodipropionate, isodecyl phenyl thiodipropionate, benzyl lauryl thiodipropionate, benzyl phenyl thiodipropionate, the diester of mixed coconut fatty alcohols and thiodipropionic acid, the diester of mixed tallow fatty alcohols and thiodipropionic acid, the acid ester of mixed cottonseed oil fatty alcohols and thiodipropionic acid, the acid ester of mixed soyabean oil fatty alcohols and thiodipropionic acid, cyclohexyl nonyl thiodipropionate, monooleyl thiodipropionic acid, hydroxyethyl lauryl thiodipropionate, monoglyceryl thiodipropionic acid, glyceryl monostearate monothiodipropionate, sorbityl isodecyl thiodipropionate, the polyester of diethylene glycol and thiodipropionic acid, the polyester of triethylene glycol and thiodipropionic acid, the polyester of hexamethylene glycol and thiodipropionic acid, the polyester of pentaerythritol and thiodipropionic acid, the polyester of octamethylene glycol and thiodipropionic acid, the polyester of p-dibenzyl alcohol and thiodipropionic acid, ethylbenzyl lauryl thiodipropionate, strontium stearyl thiodipropionate, magnesium oleyl thiodipropionate, calcium dodecylbenzyl thiodipropionate, and mono(dodecylbenzyl)thiodipropionic acid.

These esters are for the most part known compounds, but where they are not available, they are readily prepared by esterification of thiodipropionic acid and the corresponding alcohol.

Also useful are:

(1) Thioalkanoic acid amides of Tokuno et al. Japanese Pat. No. 16,286/68 having the formula:

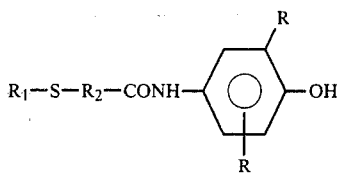

R is alkyl of one to eight carbon atoms, $R_1$ is alkyl of six to twenty-four carbon atoms, and $R_2$ is alkylene of one to six carbon atoms.

(2) Thioalkanoic acid amides of 1,3,5-triazines of Ozeki et al. Japanese Pat. No. 20,366/68 having the formula:

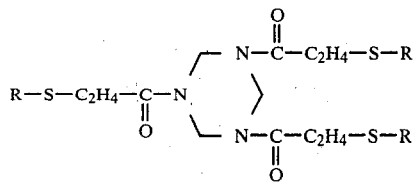

R is alkyl of eight to eighteen carbon atoms.

(3) Bis-thioalkanoic acid amides of Yamamoto et al. Japanese Pat. No. 23,765/68 having the formula:

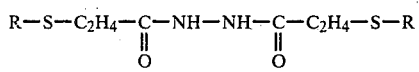

R is alkyl of more than six carbon atoms, aryl or aralkyl.

(4) Bis-thioalkylanoic acid amides of Ozeki et al. Japanese Pat. No. 26,184/69 having the formula:

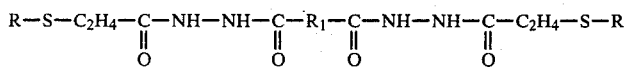

R is alkyl of twelve to eighteen carbon atoms, and $R_1$ is alkylene of one to ten carbon atoms, cycloalkylene, or arylene.

(5) Bis-alkylene thioalkanoic acid amides of Ozeki Japanese Pat. No. 31,464/69 having the formula:

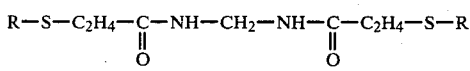

R is alkyl of more than six carbon atoms, aryl, or aralkyl.

(6) Thioalkanoic acid amide derivatives of Minagawa et al., published Japanese application No. 106,484/74 having the formula:

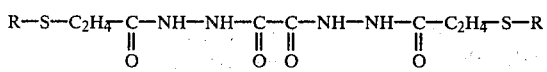

R is hydrocarbyl of one to twenty carbon atoms.

(7) Alkylene bis-thioalkanoic acid amides of U.S. Pat. No. 4,279,805 to Ohzeki et al., patented July 21, 1981, having the general formula:

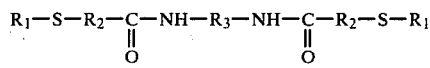

wherein:
 $R_1$ is alkyl having from one to about fifty carbon atoms;
 $R_2$ is alkylene having from one to about three carbon atoms; and
 $R_3$ is alkylene having from about two to about twelve carbon atoms.

β-Alkylthiopropionic acid esters having the general formula:

wherein:
 R is alkyl of four to twenty carbon atoms;
 n is a number from 1 to 6; and
 R' is the residue of an alcohol having from one to six hydroxyl groups.

Pentaerythritol tetra dodecyl thio propionate is an example of this group.

Other conventional light stabilizers can be employed, such as hydroxybenzophenones such as 2-hydroxy-4-methoxybenzophenone, 2-hydroxy-4-n-octoxy benzophenone, 2,4-dihydroxybenzophenone, benzotriazoles, such as 2(2-hydroxy-5-methylphenyl)benzotriazoles, 2(2-hydroxy-3-t-butyl-5-methylphenyl)-5-chlorobenzotriazole, 2(2-hydroxy-3,5-di-t-butylphenyl)-5-chlorobenzotriazole, 2(2-hydroxy-3,5-di-t-amylphenyl)-benzotriazole, benzoates such as phenylsalicylate, 2,4-di-t-butylphenyl-3,5-di-t-butyl-4-hydroxy phenylbenzoate, nickel compounds such as nickel-2,2'-thiobis(4-t-octyl-phenolate), nickel-monoethyl(3,5-di-t-butyl-4-hydroxybenzyl)phosphonate, substituted acrylonitriles such as methyl-α-cyano-β-methyl-β-(p-methoxy phenyl)acrylate and oxalic anilides such as N-2-ethyl phenyl-N'-2-ethoxy-5-t-butyl phenyl oxalic diamide, N-2-ethyl phenyl-N'-2-ethoxy phenyl oxalic diamide.

A sufficient amount of the stabilizer or combination is used to improve the resistance of the synthetic polymer to deterioration in physical properties when exposed to heat and light, including, for example, discoloration, reduction in melt viscosity and embrittlement. Very small amounts are usually adequate. Amounts within the range from about 0.001 to about 10% total stabilizers including the polymeric light stabilizer of the invention by weight of the polymer are satisfactory. Preferably, from 0.01 to 5% is employed for optimum stabilization.

Inasmuch as all components are solids, the stabilizer systems of the invention are readily rendered in solid particulate form, comprising a blend of:

(a) polymeric light stabilizer in an amount of from about 10 to about 35 parts by weight; and optionally:

(b) a phenolic antioxidant in an amount from about 10 to about 35 parts by weight; and/or (c) other heat or light stabilizers in an amount of from about 10 to about 35 parts by weight.

The polymeric light stabilizer of the invention can be employed in combination with phenolic antioxidant and/or other conventional heat and light stabilizers for the particular synthetic polymer.

Thus, for example, in the case of polyvinyl chloride resins, other polyvinyl chloride resin heat stabilizers can be included, including polyvalent metal fatty acid salts such as barium and cadmium salts of the higher fatty acids; organotin compounds; and epoxy compounds.

With polyolefin resins there can be employed fatty acid salts of polyvalent metals, and the higher fatty acid esters of thiodipropionic acids, such as, for example, dilauryl thiodipropionate.

With polyamide resin compositions, polyamide stabilizers such as copper salts in combination with iodides and/or other phosphorus compounds and salts of divalent manganese can be used.

With synthetic rubbers and acrylonitrile-butadiene-styrene terpolymers, other antioxidants and polyvalent metal salts of the higher fatty acids can be used.

In addition, other conventional additives for synthetic polymers, such as plasticizers, lubricants, emulsifiers, antistatic agents, flame-proofing agents, pigments and fillers, can be employed.

The stabilizer or combination is incorporated in the polymer in suitable mixing equipment, such as a mill or a Banbury mixer. If the polymer has a melt viscosity which is too high for the desired use, the polymer can be worked until its melt viscosity has been reduced to the desired range before addition of the stabilizer. Mixing is continued until the mixture is substantially uniform. The resulting composition is then removed from the mixing equipment and brought to the size and shape desired for marketing or use.

The stabilized polymer can be worked into the desired shape, such as by milling, calendering, extruding or injection molding or fiber-forming. In such operations, it will be found to have a considerably improved resistance to reduction in melt viscosity during the heating, as well as a better resistance to discoloration and embrittlement on ageing and heating.

The following Examples represent preferred embodiments of synthetic resin compositions in accordance with the invention:

EXAMPLES 1 TO 10

A group of polyvinyl chloride resin compositions was prepared having the following formulation:

| Ingredient | Parts by Weight |
| --- | --- |
| Polyvinyl chloride | 100 |
| Dioctyl phthalate | 48 |
| Epoxidized soybean oil | 2 |
| Tris (nonyl phenyl) phosphite | 0.2 |
| Ca stearate | 1.0 |
| Zn stearate | 0.1 |
| Stabilizer as shown in Table I | 0.3 |

This formulation was blended and sheeted off on a two-roll mill to form sheets 1 mm thick. The light resistance of these sheets was then determined by placing strips 1 cm wide in a Weather-O-Meter, and exposing them to ultraviolet light. The time in hours for the sheets to develop a noticeable discoloration and/or embrittlement, indicating deterioration due to oxidation in the presence of ultraviolet light, was then noted and is reported in Table I as Hours to Failure.

TABLE I

| Example No. | Stabilizer | | Hours to failure |
| --- | --- | --- | --- |
| Control 1 | None | | 180 |
| Control 2 | 1,2,2,6,6-Pentamethyl-4-piperidyl methacrylate polymer (M.W. 12000) | | 570 |
| Control 3 | Bis(2,2,6,6-tetramethyl-4-piperidyl) maleate | | 290 |
| | Stabilizer | Unsaturated carboxylic acid ester and Comonomer | |
| 1 | I | Bis(1,2,2,6,6-pentamethyl-4-piperidyl) itaconate | 870 |
| 2 | V | Tris(1,2,2,6,6-pentamethyl-4-piperidyl)-3-butene-1,2,3-tricarboxylate | 840 |
| 3 | VII | Bis(3-ethyl-9-aza-8,8,10,10-tetramethyl-9-(2,3-epoxypropyl) 1,5-dioxaspiro [5,5]-3-undecylmethyl)-2-methylene glutarate | 680 |
| 4 | X | 1,2,3,6-Tetramethyl-2,6-diethyl-4-piperidyl-3-cyclohexene carboxylate and Bis(1,2,2,6,6-pentamethyl-4-piperidyl)fumarate | 850 |
| 5 | XIV | Bis(2,2,6,6-tetramethyl-1-benzyl-4-piperidyl)-endomethylene tetrahydrophthalate and 2,2,6,6-tetramethyl-1-benzyl-4-piperidyl acrylate | 760 |
| 6 | XVIII | 1,2,2,6,6-Pentamethyl-4-piperidyl-2,4-hexadienoate and Bis(1,2,2,6,6-pentamethyl-4-piperidyl) fumarate | 720 |
| 7 | XX | 1-Methyl-2-(2,2,6,6-tetramethyl-4-oxo-1-piperidyl)ethyl oleate and Bis(1,2,2,6,6-pentamethyl-4-piperidyl) fumarate | 650 |
| 8 | XXIII | Dimethyl itaconate polymer (M.W. = 1200) and 2,2,6,6-Tetramethyl-4-piperidinol | 790 |
| 9 | XXVII | Diethylmethylene glutarate ethylacrylate copolymer (1:1) (M.W. = 900) and 2,2,6,6-Tetramethyl-4-piperidinol | 760 |
| 10 | XXX | Dimethyl itaconate polymer (M.W. = 1200) and 9-Aza-8,8,10,10-tetramethyl-3-ethyl-1,5-dioxaspiro [5,5]-3-undecyl methanol | 740 |

EXAMPLES 11 TO 20

Polypropylene compositions were prepared using stabilizers of the invention and two of the prior art, and having the following formulation:

| Ingredient | Parts by Weight |
| --- | --- |
| Polyproylene | 100 |
| Stearyl β-3,5-di-tert-butyl-4-hydroxyphenyl propionate | 0.2 |
| Stabilizer as shown in Table II | 0.3 |

The compositions were thoroughly blended in a Brabender Plastograph, and then compression-molded to form sheets 0.3 mm thick. Pieces 2.5 cm² were cut off from the sheets and exposed to a high voltage mercury lamp, and with and without immersion in hot water at 80° C. for fifteen hours. The Hours to Failure were noted, and the results are shown in Table II.

TABLE II

| Example No. | Stabilizer | | Hours to Failure Without Immersion | Hours to Failure After Immersion for 15 hours |
|---|---|---|---|---|
| Control 1 | | 1,2,2,6,6-Pentamethyl-4-piperidyl maleimide ethylacrylate copolymer (M.W. = 10000) | 530 | 460 |
| Control 2 | | 2,2,6,6-Tetramethyl-4-piperidyl acrylate polymer (M.W. = 13000) | 580 | 470 |
| | Stabilizer | Unsaturated carboxylic acid ester and Comonomer | | |
| 11 | II | Bis(1,2,2,6,6-pentamethyl)-4-piperidyl) itaconate and decene-1 copolymer | 850 | 770 |
| 12 | VI | Tris(1,2,2,6,6-pentamethyl-4-piperidyl)-3-butene-1,2,3-tricarboxylate and Butyl acrylate | 850 | 780 |
| 13 | X | 1,2,3,6-Tetramethyl-2,6,-diethyl-4-piperidyl-3-cyclohexene carboxylate and Bis(1,2,2,6,6-pentamethyl-4-piperidyl) fumarate | 820 | 730 |
| 14 | XIII | Bis(8-aza-6,7,9-trimethyl-7,9-diethyl-1,4-dioxaspiro [4,5]-8-decylethyl) tetrahydrophthalate and Bis(1,2,2,6,6-pentamethyl-4-piperidyl) maleate | 780 | 690 |
| 15 | XVII | Tris(1,2,2,6,6-pentamethyl-4-piperidyl) methylcyclohexene tricarboxylate and Bis(1,2,2,6,6-pentamethyl-4-piperidyl) fumarate | 760 | 670 |
| 16 | XXI | 7,7,8,9,9-Pentamethyl-8-aza-1,4-dioxaspiro[4,5]-2-decylmethyl linoleate and Bis(1,2,2,6,6-pentamethyl-4-piperidyl) fumarate | 710 | 620 |
| 17 | XXIV | Dimethylmaleate dimethyl tetrahydrophthalate copolymer (3:2) (M.W. = 1600) and 2,2,6,6-Tetramethyl-4-piperidinol | 830 | 750 |
| 18 | XXVI | Dimethylmaleate dimethyl tetrahydrophthalate copolymer (3:2) (M.W. = 1600) and 9-Aza-9-(2-hydroxybutyl)-3,3,8,8,10,10-hexamethyl-1,5-dioxaspiro [5,5]undecane | 770 | 690 |
| 19 | XXIX | Dimethyl fumarate dimethyl endomethylene tetrahydrophthalate copolymer (2:1) (M.W. = 1500) and 2,2,6,6-Tetramethyl-4-piperidinol | 780 | 680 |
| 20 | XXXI | Dimethyl itaconate dodecene-1 copolymer (1:1) (M.W. = 1300) and 2,2,6,6-Tetramethyl-4-piperidinol | 740 | 660 |

EXAMPLES 21 TO 30

Ethylene-vinyl acetate copolymer compositions were prepared using stabilizers of the invention and two of the prior art, and having the following formulation:

| Ingredient | Parts by Weight |
|---|---|
| Ethylene-vinyl acetate copolymer | 100 |
| 2,6-Di-t-butyl-p-cresol | 0.1 |
| Ca stearate | 0.1 |
| Zn stearate | 0.1 |
| Di(isodecylphenyl) phosphite | 0.2 |
| Stabilizer as shown in Table III | 0.2 |

The stabilizer was blended with the polymer on a two-roll mill at 130° C., and sheets 0.4 mm thick were then compression-molded at 140° C. from the resulting blend. Pieces 2.5 cm square were cut off from the sheets and exposed to ultraviolet light in a Weather-O-Meter for 500 hours. At the start and at the conclusion of the test, tensile strength of the sheet samples was determined. The results are shown in Table III as percent retention of the initially determined tensile strength:

TABLE III

| Example No. | Stabilizer | | % Retention of Tensile Strength After 500 hours |
|---|---|---|---|
| Control 1 | | Bis(2,2,6,6-tetramethyl-4-piperidyl) maleate/ethylene copolymer (M.W. = 2200) | 68 |
| Control 2 | | 1,2,2,6,6-Pentamethyl-4-piperidyl acrylate polymer (M.W. = 8500) | 70 |
| | Stabilizer | Unsaturated carboxylic acid ester and Comonomer | |
| 21 | I | Bis(1,2,2,6,6-pentamethyl-4-piperidyl) itaconate | 82 |
| 22 | III | Bis(1,2,2,6,6-pentamethyl-4-piperidyl)tetrahydrophthalate and bis(1,2,2,6,6-pentamethyl-4-piperidyl) fumarate copolymer | 81 |
| 23 | VI | Tris(1,2,2,6,6-pentamethyl-4-piperidyl)-3-butene-1,2,3-tricarboxylate and Butyl acrylate | 82 |
| 24 | VIII | Bis(2,2,6,6-tetramethyl-1-hydroxyethyl-4-piperidyl) dodecenyl succinate and Bis(1,2,2,6,6-pentamethyl-4-piperidyl) fumarate | 79 |
| 25 | XI | Ethyl-3,3,5,5-tetramethyl-4-aza-1-cyclohexene carboxylate and Bis(1,2,2,6,6-pentamethyl-4-piperidyl) fumarate | 81 |
| 26 | XV | Bis(2,2,6,6-tetramethyl-1-piperidylethyl) endomethylene tetrahydrophthalate and Methyl methacrylate | 76 |
| 27 | XIX | 2-Hydroxy-3-(2,2,6,6-tetramethyl-1-piperidyl) propyl-3-8-nonadienoate and 1,2,2,6,6-pentamethyl-4-piperidyl) acrylate | 76 |
| 28 | XXII | 1,2,2,6,6-Pentamethyl-4-piperidyl ricinoleate and Bis(1,2,2,6,6-pentamethyl-4-piperidyl) fumarate | 75 |
| 29 | XXV | Dimethylmaleate dimethyl tetrahydrophthalate copolymer (3:2) (M.W. = 1600) and 9-Aza-8,8,10,10-tetramethyl- | 79 |

TABLE III-continued

| Example No. | | | % Retention of Tensile Strength After 500 hours |
|---|---|---|---|
| 30 | XXVIII | 3-ethyl-1,5-dioxaspiro [5,5]-3-undecyl methanol Diethylmethylene glutarate ethylacrylate copolymer (1:1) (M.W. = 900) and 1-(2,3-Epoxypropyl)-2,2,6,6-tetramethyl-4-piperidinol | 78 |

EXAMPLES 31 TO 39

High-density polyethylene compositions were prepared using the stabilizers of the invention and two of the prior art, and having the following formulation:

| Ingredient | Parts by Weight |
|---|---|
| High-density polyethylene | 100 |
| Ca stearate | 1 |
| Tetrakis-(methylene-3-(3,5-di-t-butyl-4-hydroxyphenyl) propionate) methane | 0.1 |
| Distearyl thiodipropionate | 0.3 |
| Stabilizer as shown in Table IV | 0.2 |

The stabilizer was blended with the polymer on a two-roll mill and sheets 0.5 mm thick were prepared by compression-molding of the blend. Pieces 2.5 cm square were cut off from the sheets, and exposed in a Weather-O-Meter to ultraviolet light. The time in hours when degradation set in, as determined by a significant discoloration and/or embrittlement, was noted as hours to failure, and the results are reported in Table IV:

TABLE IV

| Example No. | Stabilizer | | Hours to failure |
|---|---|---|---|
| Control 1 | Bis(2,2,6,6-tetramethyl-4-piperidyl)adipate | | 680 |
| Control 2 | 2,2,6,6-Tetramethyl-1-piperidyl ethyl acrylate polymer (M.W. = 4000) | | 750 |
| | Stabilizer | Unsaturated carboxylic acid ester and Comonomer | |
| 31 | II | Bis(1,2,2,6,6-pentamethyl-4-piperidyl) itaconate and decene-1 copolymer | 1280 |
| 32 | IV | Dimethyl tetrahydrophthalate and bis(1,2,2,6,6-pentamethyl-4-piperidyl) fumarate copolymer | 1260 |
| 33 | IX | Tris(9-aza-3,3,8,8-10,10-hexamethyl-1,5-dioxaspiro [5,5]-9-undecylethyl-1-hexene-2,4,6-tricarboxylate and Dimethyl maleate | 1050 |
| 34 | XII | Bis(8,8,10,10-tetramethyl-9-aza-3-ethyl-1,5-dioxaspiro [5,5]-3-undecyl methyl) tetrahydrophthalate and Acrylonitrile | 1180 |
| 35 | XVI | Trimethyl-methylcyclohexene tricarboxylate and Bis(1,2,2,6,6-pentamethyl-4-piperidyl) fumarate | 1020 |
| 36 | XXIII | Dimethyl itaconate polymer (M.W. = 1200) and 2,2,6,6-Tetramethyl-4-piperidinol | 1150 |
| 37 | XXV | Dimethylmaleate dimethyl tetrahydrophthalate copolymer (3:2) (M.W. = 1600) and 9-Aza-8,8,10,10-tetramethyl-3-ethyl-1,5-dioxaspiro [5,5]-3-undecyl methanol | 1200 |
| 38 | XXIX | Dimethyl fumarate dimethyl endomethylene tetrahydrophthalate copolymer (2:1) (M.W. = 1500) and 2,2,6,6-Tetramethyl-4-piperidinol | 1150 |
| 39 | XXXI | Dimethyl itaconate dodecene-1-copolymer (1:1) (M.W. = 1300) and 2,2,6,6-Tetramethyl-4-piperidinol | 1120 |

EXAMPLES 40 TO 48

Acrylonitrile-butadiene-styrene terpolymer resin compositions were prepared using stabilizers of the invention and two of the prior art, and having the following formulations:

| Ingredient | Parts by Weight |
|---|---|
| Acrylonitrile-butadiene-styrene terpolymer | 100 |
| 4,4'-Butylidene-bis(2-tert-butyl-m-cresol) | 0.1 |
| Stabilizer as shown in Table V | 0.3 |

The stabilizer was blended with the resin on a two-roll mill, and sheets 3 mm thick were prepared by compression molding of the resulting blend. Pieces 2.5 cm square were cut off from the sheets, and subjected to ultraviolet light in a Weather-O-Meter for 800 hours. Tensile strength before and after the test exposure was determined, and the results are reported in Table V as percent of tensile strength retained at the end of this time.

TABLE V

| Example No. | Stabilizer | | % Tensile Strength retained |
|---|---|---|---|
| Control 1 | Bis(1,2,2,6,6-pentamethyl-4-piperidyl) maleate | | 58 |
| Control 2 | 1,2,2,6,6-Pentamethyl-4-piperidyl acrylate polymer (M.W. = 8500) | | 66 |
| | Stabilizer | Unsaturated carboxylic acid ester and Comonomer | |
| 40 | II | Bis(1,2,2,6,6-pentamethyl-4-piperidyl) itaconate and decene-1 copolymer | 88 |
| 41 | III | Bis(1,2,2,6,6-pentamethyl-4-piperidyl) tetrahydrophthalate and bis(1,2,2,6,6-pentamethyl-4-piperidyl) fumarate copolymer | 86 |
| 42 | V | Tris(1,2,2,6,6-pentamethyl-4-piperidyl)-3-butene-1,2,3-tricarboxylate | 88 |
| 43 | VIII | Bis(2,2,6,6-tetramethyl-1-hydroxyethyl-4-piperidyl) dodecenyl succinate and Bis(1,2,2,6,6-pentamethyl-4-piperidyl) fumarate | 82 |
| 44 | XI | Ethyl-3,3,5,5-tetramethyl-4-aza-1-cyclohexene carboxylate and Bis(1,2,2,6,6-pentamethyl-4-piperidyl fumarate | 87 |
| 45 | XIV | Bis(2,2,6,6-tetramethyl-1-benzyl-4-piperidyl)-endomethylene tetrahydrophthalate and 2,2,6,6-tetramethyl-1-benzyl-4- | 83 |

TABLE V-continued

| Example No. | | | % Tensile Strength retained |
|---|---|---|---|
| 46 | XXIV | piperidyl acrylate Dimethylmaleate dimethyl tetrahydrophthalate copolymer (3:2) (M.W. = 1600) and 2,2,6,6-Tetramethyl-4-piperidinol | 86 |
| 47 | XXVII | Diethylmethylene glutarate ethylacrylate copolymer (1:1) (M.W. = 900) and 2,2,6,6-Tetramethyl-4-piperidinol | 83 |
| 48 | XXX | Dimethyl itaconate (M.W. = 1200) and 9-Aza-8,8,10,10-tetramethyl-3-ethyl-1,5-dioxaspiro [5,5]-3-undecyl methanol | 84 |

EXAMPLES 49 TO 56

Conventional heat stabilizers for polymeric materials may lose their effectiveness because of volatilization or decomposition at high polymer processing temperatures. This is not true of the stabilizers of the invention, as shown by observing the effect of heat in repeated extrusions of ethylene-propylene copolymer compositions. These compositions were prepared using stabilizers of the invention and of the prior art, and having the following formulation:

| Ingredient | Parts by Weight |
|---|---|
| Ethylene-propylene copolymer | 100 |
| Stearyl-(3,5-di-t-butyl-4-hydroxyphenyl) propionate | 0.1 |
| Ca stearate | 0.2 |
| Dilauryl thiodipropionate | 0.2 |
| Stabilizer as shown in Table VI | 0.2 |

The ingredients were mixed and the compositions then extruded (cylinder temperature 230° C. and 240° C., head die temperature 250° C., velocity 20 rpm) five times. Test pieces were then molded by injection molding at 250° C. The test pieces were exposed to a high voltage mercury lamp, and the hours to failure noted, as shown in Table VI.

TABLE VI

| Example No. | Stabilizer | Unsaturated carboxylic acid ester and Comonomer | Hours to Failure Extruded 1 time | Hours to Failure Extruded 5 times |
|---|---|---|---|---|
| Control 1 | | Bis(1,2,2,6,6-pentamethyl-4-piperidyl) maleate | 380 | 210 |
| Control 2 | | Bis(1,2,2,6,6-pentamethyl-4-piperidyl) fumarate ethylene copolymer (M.W. = 2500) | 530 | 370 |
| 49 | I | Bis(1,2,2,6,6-pentamethyl-4-piperidyl) itaconate | 670 | 600 |
| 50 | III | Bis(1,2,2,6,6-pentamethyl-4-piperidyl) tetrahydrophthalate and bis(1,2,2,6,6-pentamethyl-4-piperidyl) fumarate copolymer | 660 | 590 |
| 51 | IV | Dimethyl tetrahydrophthalate and bis(1,2,2,6,6-pentamethyl-4-piperidyl) fumarate copolymer | 660 | 580 |
| 52 | VI | Tris(1,2,2,6,6-pentamethyl-4-piperidyl)-3-butene-1,2,3-tricarboxylate and Butyl acrylate | 650 | 580 |
| 53 | X | 1,2,3,6-Tetramethyl-2,6-diethyl-4-piperidyl-3-cyclohexene carboxylate and Bis(1,2,2,6,6-pentamethyl-4-piperidyl) fumarate | 670 | 590 |
| 54 | XIII | Bis(8-aza-6,7,9-trimethyl-7,9-diethyl-1,4-dioxaspiro [4,5]-8-decylethyl) tetrahydrophthalate and Bis(1,2,2,6,6-pentamethyl-4-piperidyl) maleate | 640 | 580 |
| 55 | XXVI | Dimethylmaleate dimethyl tetrahydrophthalate copolymer (3:2) (M.W. = 1600) and 9-Aza-9-(2-hydroxybutyl)-3,3,8,8,10,10-hexamethyl-1,5-dioxaspiro [5,5] undecane | 620 | 560 |
| 56 | XXX | Dimethyl itaconate (M.W. = 1200) and 9-Aza-8,8,10,10-tetramethyl-3-ethyl-1,5-dioxaspiro [5,5]-3-undecyl methanol | 640 | 580 |

EXAMPLES 57 TO 62

Polyurethane resin compositions were prepared using stabilizers of the invention and having the following formulation:

| Ingredient | Parts by Weight |
|---|---|
| Polyurethane resin (Asahi Denka[1]-U-100) | 100 |
| Ca stearate | 0.7 |
| Zn stearate | 0.3 |
| 2,6-di-t-butyl-p-cresol | 0.1 |
| Stabilizer as shown in Table VII | 0.3 |

[1]A Polyurethane-isocyanurate made from toluene diisocyanate and alkylene polyol.

The stabilizer was blended with the finely powdered polyurethane resin on a two-roll mill for five minutes at 70° C., and the sheet was then compression-molded at 120° C. for five minutes to form sheets 0.5 mm thick. Pieces 2.5 cm square were cut out from the sheets, and exposed to ultraviolet light in a Weather-O-Meter for thirty hours. Elongation before and after exposure was determined, and the percent elongation retained after the exposure is given in Table VII.

TABLE VII

| Example No. | Stabilizer | | % Elongation Retention |
|---|---|---|---|
| Control 1 | | Bis(1,2,2,6,6-pentamethyl-4-piperidyl) maleate | 53 |
| Control 2 | | 1,2,2,6,6-Pentamethyl-4-piperidyl acrylate polymer (M.W. = 8500) Unsaturated carboxylic acid | 59 |

TABLE VII-continued

| Example No. | Stabilizer | ester and comonomer | % Elongation Retention |
|---|---|---|---|
| 57 | IV | Dimethyl tetrahydrophthalate and bis(1,2,2,6,6-pentamethyl-4-piperidyl) fumarate copolymer | 78 |
| 58 | V | Tris(1,2,2,6,6-pentamethyl-4-piperidyl)-3-butene-1,2,3-tricarboxylate | 76 |
| 59 | XI | Ethyl-3,3,5,5-tetramethyl-4-aza-1-cyclohexene carboxylate and Bis(1,2,2,6,6-pentamethyl-4-piperidyl) fumarate | 77 |
| 60 | XII | Bis(8,8,10,10-tetramethyl-9-aza-3-ethyl-1,5-dioxaspiro[5.5]-3-undecylmethyl) tetrahydrophthalate and Acrylonitrile | 73 |
| 61 | XXIV | Dimethylmaleate dimethyl tetrahydrophthalate copolymer (3:2) (M.W. = 1600) and 2,2,6,6-Tetramethyl-4-piperidinol | 76 |
| 62 | XXVIII | Diethylmethylene glutaric ethylacrylate copolymer (1:1) (M.W. = 900) and 1-(2,3-Epoxypropyl)-2,2,6,6-tetramethyl-4-piperidinol | 74 |

Having regard to the foregoing disclosure, the following is claimed as the inventive and patentable embodiments thereof:

1. Polymeric light stabilizers for synthetic polymers comprising a polymer molecule made of polymer units having a molecular weight within the range from about 1000 to about 20,000 and including a plurality of polymer units having at least one 2,2,6,6-tetraalkyl piperidyl group, the polymer units being selected from the group consisting of unsaturated carboxylic acid ester units selected from the group consisting of unsaturated cycloaliphatic mono-, di-, and tricarboxylic acid ester units having from seven to about thirty carbon atoms; unsaturated branched-chain aliphatic di- and tricarboxylic acid ester units having from four to about thirty carbon atoms; sorbic acid ester units, 3,8-nonadienyl acid ester units, oleic acid ester units, linolenic acid ester units, and ricinoleic acid ester units; and copolymer units of at least one unsaturated monomer copolymerizable therewith.

2. Polymeric light stabilizers according to claim 1 in which the unsaturated carboxylic acid ester units are ester units of an unsaturated carboxylic acid esterified with a 2,2,6,6-tetraalkyl piperidyl alcohol.

3. Polymeric light stabilizers according to claim 2 in which the polymer units include copolymer units of at least one copolymerizable unsaturated monomer.

4. Polymeric light stabilizers according to claim 3 in which the copolymer units are units selected from the group consisting of ethylene, propylene, butene-1, isobutene, hexene, octene, decene, dodecene, tetradecene, hexadecene, octadecene, eicosene, styrene, α-methylstyrene, cyclohexene, butadiene, vinyl chloride, acrylonitrile, methyl vinyl ketone, methyl vinyl ether, vinyl acetate, acrylic acid, methacrylic acid, maleic anhydride, methyl acrylate, butyl acrylate, methyl methacrylate, dimethyl maleate, diethyl maleate, and dibutyl maleate.

5. Polymeric light stabilizers according to claim 1 in which the polymer units include copolymer units of at least one copolymerizable unsaturated monomer containing a 2,2,6,6-tetraalkyl piperidyl group.

6. Polymeric light stabilizers according to claim 5 in which the copolymer units are selected from the group consisting of 2,2,6,6-tetramethyl-4-piperidyl vinyl ether, 1,2,2,6,6-pentamethyl-4-piperidyl vinyl ether, 2,2,6,6-tetramethyl-4-piperidyl allyl ether, 1,2,2,6,6-pentamethyl-4-piperidyl allyl ether, and esters of acrylic acid, methacrylic acid, maleic acid and fumaric acid with an 2,2,6,6-tetraalkyl piperidyl alcohol.

7. Polymeric light stabilizers according to claim 1 in which the unsaturated carboxylic acid ester units are ester units of an unsaturated cycloaliphatic carboxylic acid ester.

8. Polymeric light stabilizers according to claim 7 in which the unsaturated cycloaliphatic carboxylic acid is selected from the group consisting of cyclohexene carboxylic acid; methyl cyclohexene carboxylic acid; 3,3,5,5-tetramethyl-4-1-cyclohexene carboxylic acid; tetrahydrophthalic acid; methyl tetrahydrophthalic acid; cyclohexene-1,2,3-tricarboxylic acid; methyl cyclohexene-1,2,3-tricarboxylic acid; endomethylene tetrahydrophthalic acid; methyl endomethylene tetrahydrophthalic acid; methyl isopropyl bicyclo-(2,2,2)-5-hexene-2,3-dicarboxylic acid; abietic acid; neoabietic acid; and levopimaric acid esters.

9. Polymeric light stabilizers according to claim 1 in which the unsaturated carboxylic acid ester units are ester units of an unsaturated branched-chain aliphatic carboxylic acid ester.

10. Polymeric light stabilizers according to claim 9 in which the unsaturated branched-chain aliphatic carboxylic acid is selected from the group consisting of itaconic acid; 2-methylene glutaric acid; alkenyl succinic acids such as diisobutenyl succinic acid, dodecenyl succinic acid and octadecenyl succinic acid; 3-butene-1,2,3-tricarboxylic acid; and 1-hexene-2,4,6-tricarboxylic acid esters.

11. Polymeric light stabilizers according to claim 1 in which the unsaturated branched-chain aliphatic carboxylic acid is a polymer of bis(1,2,2,6,6-pentamethyl-4-piperidyl)itaconate.

12. Polymeric light stabilizers according to claim 1 in which the unsaturated branched-chain aliphatic carboxylic acid is a copolymer of 1,2,3,6-tetramethyl-2,6-diethyl-4-piperidyl-3-cyclohexene carboxylate and bis(1,2,2,6,6-pentamethyl-4-piperidyl)fumarate.

13. A stabilizer composition for synthetic resins comprising:
(1) at least one polymeric light stabilizer in accordance with claim 1 and
(2) at least one phenolic antioxidant having at least one phenolic hydroxyl group, and at least one phenolic nucleus, and from about eight to about three hundred carbon atoms.

14. A stabilizer composition for synthetic resins according to claim 13 in which the phenolic antioxidant is a monocyclic phenol having the structure:

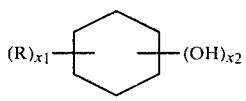

wherein:
R is selected from the group consisting of hydrogen; halogen; and organic radicals containing from one to about thirty carbon atoms selected from the group consisting of alkyl, aryl, alkenyl, alkaryl, aralkyl, cycloalkenyl, cycloalkyl, alkoxy, and

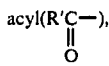

where

R′ is aryl, alkyl or cycloalkyl; and $x_1$ and $x_2$ are integers from one to four, and the sum of $x_1$ and $x_2$ does not exceed six.

15. A stabilizer composition for synthetic resins according to claim 13 in which the phenolic antioxidant is a polycyclic phenol having at least two aromatic nuclei linked by a polyvalent linking radical, as defined by the formula:

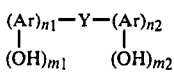

wherein:

Y is a polyvalent linking group selected from the group consisting of oxygen; carbonyl; sulfur; sulfinyl; aromatic, aliphatic and cycloaliphatic hydrocarbon groups; and oxyhydrocarbon; thiohydrocarbon and heterocyclic groups having from one up to twenty carbon atoms;

Ar is a phenolic nucleus selected from the group consisting of phenyl and polycarbocyclic groups having condensed or separate phenyl rings; each Ar group containing at least one free phenolic hydroxyl group up to a total of five; and $m_1$ and $m_2$ are numbers from one to five, and $n_1$ and $n_2$ are numbers of one or greater.

16. A stabilizer composition for synthetic resins according to claim 13 in which the phenolic antioxidant is a polyhydric polycyclic phenol having the structure:

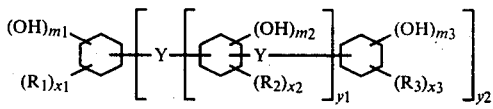

wherein:

$R_1$, $R_2$ and $R_3$ are inert substituent groups;

$m_1$ and $m_3$ are integers from one to a maximum of five;

$m_2$ is an integer from one to a maximum of four;

$x_1$ and $x_3$ are integers from zero to four, and $x_2$ is an integer from zero to three;

$y_1$ is an integer from zero to about six; and $y_2$ is an integer from one to five.

17. A polyvinyl chloride resin composition having improved resistance to deterioration, comprising a polyvinyl chloride resin and a polymeric light stabilizer in accordance with claim 1.

18. A polyvinyl chloride resin composition in accordance with claim 17 in which the polyvinyl chloride resin is polyvinyl chloride homopolymer.

19. A polyvinyl chloride resin composition in accordance with claim 17 in which the polyvinyl chloride resin is a copolymer of vinyl chloride and vinyl acetate.

20. An olefin polymer composition having improved resistance to deterioration comprising an olefin polymer selected from the group consisting of polymers of alpha-olefins having from two to six carbon atoms and polystyrene, and a polymeric light stabilizer in accordance with claim 1.

21. An olefin polymer composition in accordance with claim 20 wherein the polyolefin is polypropylene.

22. An olefin polymer composition in accordance with claim 20 wherein the polyolefin is polyethylene.

23. A polyester polymer composition having improved resistance to deterioration comprising a polyester and a polymeric light stabilizer in accordance with claim 1.

24. A polyurethane resin composition having improved resistance to deterioration, comprising a polyurethane resin and a polymeric light stabilizer in accordance with claim 1.

25. An ethylene-vinyl acetate copolymer composition having improved resistance to deterioration comprising an ethylene-vinyl acetate copolymer and a polymeric light stabilizer in accordance with claim 1.

26. An acrylonitrile-butadiene-styrene polymer having improved resistance to deterioration, comprising an acrylonitrile-butadiene-styrene polymer and a polymeric light stabilizer in accordance with claim 1.

* * * * *